US012757281B2

(12) United States Patent
Liu et al.

(10) Patent No.: US 12,757,281 B2
(45) Date of Patent: Oct. 6, 2026

(54) NESTED SEARCH SPACE ENHANCEMENTS

(71) Applicant: QUALCOMM Incorporated, San Diego, CA (US)

(72) Inventors: Kangqi Liu, San Diego, CA (US); Gabi Sarkis, San Diego, CA (US); Mostafa Khoshnevisan, San Diego, CA (US); Le Liu, San Jose, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 18/600,521

(22) Filed: Mar. 8, 2024

(65) Prior Publication Data

US 2025/0287451 A1 Sep. 11, 2025

(51) Int. Cl.

| | |
|---|---|
| ***H04W 76/20*** | (2018.01) |
| ***H04W 52/02*** | (2009.01) |
| ***H04W 72/0446*** | (2023.01) |
| ***H04W 72/231*** | (2023.01) |

(52) U.S. Cl.

CPC ....... *H04W 76/20* (2018.02); *H04W 52/0235* (2013.01); *H04W 72/0446* (2013.01); *H04W 72/231* (2023.01)

(58) Field of Classification Search

CPC ............ H04W 76/20; H04W 52/0235; H04W 72/0446; H04W 72/231; H04W 52/0216; H04W 52/0229; H04W 76/28

See application file for complete search history.

(56) References Cited

U.S. PATENT DOCUMENTS

2023/0254716 A1* 8/2023 Khoshnevisan ...... H04W 16/28 370/329

* cited by examiner

*Primary Examiner* — Diane D Mizrahi
(74) *Attorney, Agent, or Firm* — Holland & Hart LLP

(57) ABSTRACT

Methods, systems, and devices for wireless communications are described. A user equipment (UE) may obtain an indication of a nesting state for a search space set of a control channel, wherein the nesting state corresponds to one or more wireless communication parameters of the UE. The UE may search one or more control channel elements (CCEs) of the search space set for a control message according to the nesting state. The UE may obtain the control message via the control channel based at least in part on a result of the searching.

20 Claims, 18 Drawing Sheets

NESTED SEARCH SPACE ENHANCEMENTS

FIELD OF TECHNOLOGY

The following relates to wireless communications, including nested search space enhancements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support nested search space enhancements. For example, the described techniques provide various enhancements for nesting operations based on various wireless communication parameters of a user equipment (UE). For example, a network entity may transmit or otherwise output an indication of a nesting state to a UE. The nesting state may be for a search space set (SSS) of a control channel (e.g., a physical downlink control channel (PDCCH)). The SSS may generally define the frequency resources (e.g., the control channel elements (CCEs)) within the control channel that the UE is to search for a control message (e.g., a downlink control information (DCI)). However, the nesting state may generally correspond to various wireless communication parameters of or otherwise associated with the UE. For example, the wireless communications parameters may include, but are not limited to, control channel switching, SSS group (SSSG) switching, a discontinuous reception (DRX) or wakeup signal (WUS) configuration, or other wireless communication parameters of the UE. Accordingly, the UE may search the CCEs of the SSS for a control message according to the nesting state. For example, the UE may receive or otherwise obtain the control message via the control channel based on a result of the searching.

A method for wireless communications by a UE is described. The method may include obtaining an indication of a nesting state for a SSS of a control channel, where the nesting state corresponds to one or more wireless communication parameters of the UE, searching one or more CCEs of the SSS for a control message according to the nesting state, and obtaining the control message via the control channel based on a result of the searching.

A UE for wireless communications is described. The UE may include at least one processor and at least one memory coupled with the at least one processor, with instructions stored in the at least one memory, the instructions being executable by the at least one processor, individually or in any combination, to cause the UE to obtain an indication of a nesting state for a SSS of a control channel, where the nesting state corresponds to one or more wireless communication parameters of the UE, search one or more CCEs of the SSS for a control message according to the nesting state, and obtain the control message via the control channel based on a result of the searching.

Another UE for wireless communications is described. The UE may include means for obtaining an indication of a nesting state for a SSS of a control channel, where the nesting state corresponds to one or more wireless communication parameters of the UE, means for searching one or more CCEs of the SSS for a control message according to the nesting state, and means for obtaining the control message via the control channel based on a result of the searching.

A non-transitory computer-readable medium storing code for wireless communications is described. The code may include instructions executable by one or more processors to obtain an indication of a nesting state for a SSS of a control channel, where the nesting state corresponds to one or more wireless communication parameters of the UE, search one or more CCEs of the SSS for a control message according to the nesting state, and obtain the control message via the control channel based on a result of the searching.

In some examples of the method, user equipment (UEs), and non-transitory computer-readable medium described herein, the one or more wireless communication parameters include a control channel skipping duration that identifies a quantity of search space monitoring occasions to skip during a set of one or more slots.

In some examples of the method, user equipment (UEs), and non-transitory computer-readable medium described herein, obtaining the indication may include operations, features, means, or instructions for determining that the control channel skipping duration exceeds a threshold number of slots, where the nesting state includes a nesting disabled state based on the control channel skipping duration exceeding the threshold number of slots.

In some examples of the method, user equipment (UEs), and non-transitory computer-readable medium described herein, obtaining the indication may include operations, features, means, or instructions for determining that the control channel skipping duration may have satisfied or may be less than a threshold number of slots, where the nesting state includes a nesting enabled state based on the control channel skipping duration satisfying or being less than the threshold number of slots.

In some examples of the method, user equipment (UEs), and non-transitory computer-readable medium described herein, obtaining the indication may include operations, features, means, or instructions for determining that the control channel skipping duration exceeds a threshold number of slots, where the nesting state includes a nesting enabled state based on the control channel skipping duration exceeding the threshold number of slots.

In some examples of the method, user equipment (UEs), and non-transitory computer-readable medium described herein, obtaining the indication may include operations, features, means, or instructions for determining that the control channel skipping duration may have satisfied or may be less than a threshold number of slots, where the nesting state includes a nesting disabled state based on the control channel skipping duration satisfying or being less than the threshold number of slots.

In some examples of the method, user equipment (UEs), and non-transitory computer-readable medium described herein, the one or more wireless communication parameters include a SSS group (SSSG) switching configuration that identifies a set of SSSs for the UE to switch between.

In some examples of the method, user equipment (UEs), and non-transitory computer-readable medium described herein, obtaining the indication may include operations, features, means, or instructions for obtaining information identifying a set of SSSG switching configurations, where the information includes one or more bits that identify which of one or more SSSG switching configurations in the set of SSSG switching configurations may be associated with a nesting enabled state.

In some examples of the method, user equipment (UEs), and non-transitory computer-readable medium described herein, obtaining the indication may include operations, features, means, or instructions for obtaining information identifying a set of SSSG switching configurations, where the set of SSSG switching configurations include a first subset of one or more SSSG switching configurations that may be associated with a nesting enabled state and a second subset of one or more SSSG switching configurations that may be associated with a nesting disabled state.

In some examples of the method, user equipment (UEs), and non-transitory computer-readable medium described herein, the one or more wireless communication parameters include a DRX state that defines DRX ON periods where the UE may be in an active state and DRX OFF periods where the UE may be in an inactive state.

In some examples of the method, user equipment (UEs), and non-transitory computer-readable medium described herein, obtaining the indication may include operations, features, means, or instructions for operating in a nesting disabled state during the DRX ON periods and in a nesting enabled state during the DRX OFF periods.

In some examples of the method, user equipment (UEs), and non-transitory computer-readable medium described herein, obtaining the indication may include operations, features, means, or instructions for operating in a first nesting state based on a DRX inactivity timer duration satisfying a threshold and in a second nesting state based on the DRX inactivity timer duration failing to satisfy the threshold, where the first nesting state may be different from the second nesting state, and where the first nesting state may be a nesting enabled state or a nesting disabled state.

In some examples of the method, user equipment (UEs), and non-transitory computer-readable medium described herein, obtaining the indication may include operations, features, means, or instructions for operating in a first nesting state based on a DRX periodicity satisfying a threshold and in a second nesting state based on the DRX periodicity failing to satisfy the threshold, where the first nesting state may be different from the second nesting state, and where the first nesting state may be a nesting enabled state or a nesting disabled state.

In some examples of the method, user equipment (UEs), and non-transitory computer-readable medium described herein, obtaining the indication may include operations, features, means, or instructions for operating in a first nesting state based on a first type of DRX state and in a second nesting state based on a second type of DRX state, where the first nesting state may be different from the second nesting state, and where the first nesting state may be a nesting enabled state or a nesting disabled state.

In some examples of the method, user equipment (UEs), and non-transitory computer-readable medium described herein, obtaining the indication may include operations, features, means, or instructions for obtaining a wakeup signal prior to each DRX ON period, where the wakeup signal indicates the nesting state for the DRX ON period.

In some examples of the method, user equipment (UEs), and non-transitory computer-readable medium described herein, and the method, apparatuses, and non-transitory computer-readable medium may include further operations, features, means, or instructions for performing a first hashing operation for the SSS in a first set of CCEs associated with a first aggregation level (AL) and performing a second hashing operation for the SSS in a second set of CCEs associated with a second AL that may be a lower AL than the first AL, where a quantity of CCEs in the second set of CCEs may be based on CCEs in first set of CCEs, and where a quantity of hashing operations in the second hashing operation in the second set of CCEs may be a divisible function based on CCEs in the first set of CCEs.

In some examples of the method, user equipment (UEs), and non-transitory computer-readable medium described herein, and the method, apparatuses, and non-transitory computer-readable medium may include further operations, features, means, or instructions for performing a first hashing operation for the SSS in a first set of CCEs associated with a first AL and performing a second hashing operation for the SSS in a second set of CCEs associated with a second AL that may be a lower AL than the first AL, where a quantity of CCEs in the second set of CCEs may be any quantity of CCEs within the first set of CCEs, and where a quantity of hashing operations in the second hashing operation in the second set of CCEs corresponds to any CCEs in the first set of CCEs.

In some examples of the method, user equipment (UEs), and non-transitory computer-readable medium described herein, the SSS includes a first quantity of CCEs that may be associated with a nesting enabled state and a second quantity of CCEs that may be associated with the nesting enabled state or a nesting disabled state and the first quantity of CCEs may be non-overlapping CCEs with the second quantity of CCEs.

In some examples of the method, user equipment (UEs), and non-transitory computer-readable medium described herein, the SSS may be on a first carrier and includes a first set of AL 16 CCEs associated with the first carrier and a second set of AL 16 CCEs associated with a second carrier that may be cross-carrier scheduled by the first carrier and the first set of AL 16 CCEs, the second set of AL 16 CCEs, or both, include one or more subsets of CCEs having a lower AL that may be nested according to the nesting state.

In some examples of the method, user equipment (UEs), and non-transitory computer-readable medium described herein, at least one subset in the one or more subsets of CCEs in the first set of AL 16 CCEs, in the second set of AL 16 CCEs, or both, schedule communications on the first carrier or on the second carrier.

In some examples of the method, user equipment (UEs), and non-transitory computer-readable medium described herein, obtaining the indication may include operations, features, means, or instructions for receiving the indication of the nesting state separately from the one or more wireless communication parameters.

Some examples of the method, user equipment (UEs), and non-transitory computer-readable medium described herein may further include operations, features, means, or instructions for receiving a second indication that activates or deactivates the nesting state.

In some examples of the method, user equipment (UEs), and non-transitory computer-readable medium described herein, the indication may be received in a radio resource control (RRC) message, a medium access control-control element (MAC-CE), a downlink control information (DCI), or any combination thereof.

In some examples of the method, user equipment (UEs), and non-transitory computer-readable medium described herein, the one or more wireless communication parameters include a control resource set configuration, a SSS configuration, a SSS group configuration, a bandwidth part configuration, a search space type configuration, a search space overlap configuration, or any combination thereof.

Some examples of the method, user equipment (UEs), and non-transitory computer-readable medium described herein may further include operations, features, means, or instructions for receiving a first portion of a downlink control information according to a nesting disabled state and receiving a second portion of the downlink control information according to a nesting enabled state.

Some examples of the method, user equipment (UEs), and non-transitory computer-readable medium described herein may further include operations, features, means, or instructions for transmitting a message requesting activation or deactivation of the nesting state.

Some examples of the method, user equipment (UEs), and non-transitory computer-readable medium described herein may further include operations, features, means, or instructions for transmitting a message requesting switching between a first nesting state and a second nesting state.

Some examples of the method, user equipment (UEs), and non-transitory computer-readable medium described herein may further include operations, features, means, or instructions for transmitting a message indicating support for nesting operations with the SSS.

Some examples of the method, user equipment (UEs), and non-transitory computer-readable medium described herein may further include operations, features, means, or instructions for receiving a message requesting a preferred nesting state of the UE and transmitting the preferred nesting state according to the message.

A method for wireless communications by a network entity is described. The method may include outputting, to a UE, an indication of a nesting state for a SSS of a control channel, where the nesting state corresponds to one or more wireless communication parameters of the UE and indicates that the UE is to search one or more CCEs of the SSS for a control message according to the nesting state and outputting, to the UE, the control message via the control channel in accordance with the nesting state.

A network entity for wireless communications is described. The network entity may include at least one processor at least one memory coupled with the at least one processor, with instructions stored in the at least one memory, the instructions being executable by the at least one processor, individually or in any combination, to cause the network entity to output, to a UE, an indication of a nesting state for a SSS of a control channel, where the nesting state corresponds to one or more wireless communication parameters of the UE and indicates that the UE is to search one or more CCEs of the SSS for a control message according to the nesting state and output, to the UE, the control message via the control channel in accordance with the nesting state.

Another network entity for wireless communications is described. The network entity may include means for outputting, to a UE, an indication of a nesting state for a SSS of a control channel, where the nesting state corresponds to one or more wireless communication parameters of the UE and indicates that the UE is to search one or more CCEs of the SSS for a control message according to the nesting state and means for outputting, to the UE, the control message via the control channel in accordance with the nesting state.

A non-transitory computer-readable medium storing code for wireless communications is described. The code may include instructions executable by one or more processors to output, to a UE, an indication of a nesting state for a SSS of a control channel, where the nesting state corresponds to one or more wireless communication parameters of the UE and indicates that the UE is to search one or more CCEs of the SSS for a control message according to the nesting state and output, to the UE, the control message via the control channel in accordance with the nesting state.

In some examples of the method, network entities, and non-transitory computer-readable medium described herein, the one or more wireless communication parameters include a control channel skipping duration that identifies a quantity of search space monitoring occasions to skip during a set of one or more slots.

In some examples of the method, network entities, and non-transitory computer-readable medium described herein, the nesting state includes a nesting disabled state based on the control channel skipping duration exceeding a threshold number of slots.

In some examples of the method, network entities, and non-transitory computer-readable medium described herein, the nesting state includes a nesting enabled state based on the control channel skipping duration satisfying or being less than a threshold number of slots.

In some examples of the method, network entities, and non-transitory computer-readable medium described herein, the nesting state includes a nesting enabled state based on the control channel skipping duration exceeding a threshold number of slots.

In some examples of the method, network entities, and non-transitory computer-readable medium described herein, the nesting state includes a nesting disabled state based on the control channel skipping duration satisfying or being less than a threshold number of slots.

In some examples of the method, network entities, and non-transitory computer-readable medium described herein, the one or more wireless communication parameters include a SSSG switching configuration that identifies a set of SSSs for the UE to switch between.

In some examples of the method, network entities, and non-transitory computer-readable medium described herein, outputting the indication may include operations, features, means, or instructions for outputting information to the UE that identifies a set of SSSG switching configurations, where the information includes one or more bits that identify which of one or more SSSG switching configurations in the set of SSSG switching configurations may be associated with a nesting enabled state.

In some examples of the method, network entities, and non-transitory computer-readable medium described herein, outputting the indication may include operations, features, means, or instructions for outputting information to the UE that identifies a set of SSSG switching configurations, where the set of SSSG switching configurations include a first subset of one or more SSSG switching configurations that may be associated with a nesting enabled state and a second subset of one or more SSSG switching configurations that may be associated with a nesting disabled state.

In some examples of the method, network entities, and non-transitory computer-readable medium described herein, the one or more wireless communication parameters include a DRX state that defines DRX ON periods where the UE may be in an active state and DRX OFF periods where the UE may be in an inactive state.

In some examples of the method, network entities, and non-transitory computer-readable medium described herein, outputting the indication may include operations, features, means, or instructions for operating in a first nesting state during the DRX ON periods and in a second nesting state during the DRX OFF periods, where the first nesting state may be different from the second nesting state, and where the first nesting state may be a nesting enabled state or a nesting disabled state.

In some examples of the method, network entities, and non-transitory computer-readable medium described herein, outputting the indication may include operations, features, means, or instructions for operating in a first nesting state based on a DRX inactivity timer duration satisfying a threshold and in a second nesting state based on the DRX inactivity timer duration failing to satisfy the threshold, where the first nesting state may be different from the second nesting state, and where the first nesting state may be a nesting enabled state or a nesting disabled state.

Some examples of the method, network entities, and non-transitory computer-readable medium described herein may further include operations, features, means, or instructions for operating in a first nesting state based on a DRX periodicity satisfying a threshold and in a second nesting state based on the DRX periodicity failing to satisfy the threshold, where the first nesting state may be different from the second nesting state, and where the first nesting state may be a nesting enabled state or a nesting disabled state.

Some examples of the method, network entities, and non-transitory computer-readable medium described herein may further include operations, features, means, or instructions for operating in a first nesting state based on a first type of DRX state and in a second nesting state based on a second type of DRX state, where the first nesting state may be different from the second nesting state, and where the first nesting state may be a nesting enabled state or a nesting disabled state.

In some examples of the method, network entities, and non-transitory computer-readable medium described herein, outputting the indication may include operations, features, means, or instructions for outputting a wakeup signal prior to each DRX ON period, where the wakeup signal indicates the nesting state for the DRX ON period.

In some examples of the method, network entities, and non-transitory computer-readable medium described herein, and the method, apparatuses, and non-transitory computer-readable medium may include further operations, features, means, or instructions for performing a first hashing operation for the SSS in a first set of CCEs associated with a first AL and performing a second hashing operation for the SSS in a second set of CCEs associated with a second AL that may be a lower AL than the first AL, where a quantity of CCEs in the second set of CCEs may be based on CCEs in first set of CCEs, and where a quantity of hashing operations in the second hashing operation in the second set of CCEs may be a divisible function based on CCEs in the first set of CCEs.

In some examples of the method, network entities, and non-transitory computer-readable medium described herein, and the method, apparatuses, and non-transitory computer-readable medium may include further operations, features, means, or instructions for performing a first hashing operation for the SSS in a first set of CCEs associated with a first AL and performing a second hashing operation for the SSS in a second set of CCEs associated with a second AL that may be a lower AL than the first AL, where a quantity of CCEs in the second set of CCEs may be any quantity of CCEs within the first set of CCEs, and where a quantity of hashing operations in the second hashing operation in the second set of CCEs corresponds to any CCEs in the first set of CCEs.

In some examples of the method, network entities, and non-transitory computer-readable medium described herein, the SSS includes a first quantity of CCEs that may be associated with a nesting enabled state and a second quantity of CCEs that may be associated with the nesting enabled state or a nesting disabled state and the first quantity of CCEs may be non-overlapping CCEs with the second quantity of CCEs.

In some examples of the method, network entities, and non-transitory computer-readable medium described herein, the SSS may be on a first carrier and includes a first set of AL 16 CCEs associated with the first carrier and a second set of AL 16 CCEs associated with a second carrier that may be cross-carrier scheduled by the first carrier and the first set of AL 16 CCEs, the second set of AL 16 CCEs, or both, include one or more subsets of CCEs having a lower AL that may be nested according to the nesting state.

In some examples of the method, network entities, and non-transitory computer-readable medium described herein, at least one subset in the one or more subsets of CCEs in the first set of AL 16 CCEs, in the second set of AL 16 CCEs, or both, schedule communications on the first carrier or on the second carrier.

In some examples of the method, network entities, and non-transitory computer-readable medium described herein, outputting the indication may include operations, features, means, or instructions for outputting the indication of the nesting state separately from the one or more wireless communication parameters.

Some examples of the method, network entities, and non-transitory computer-readable medium described herein may further include operations, features, means, or instructions for outputting a second indication that activates or deactivates the nesting state.

In some examples of the method, network entities, and non-transitory computer-readable medium described herein, the indication may be output in an RRC message, a MAC-CE, a DCI, or any combination thereof.

In some examples of the method, network entities, and non-transitory computer-readable medium described herein, the one or more wireless communication parameters include a control resource set configuration, a SSS configuration, a SSS group configuration, a bandwidth part configuration, a search space type configuration, a search space overlap configuration, or any combination thereof.

Some examples of the method, network entities, and non-transitory computer-readable medium described herein may further include operations, features, means, or instructions for outputting a first portion of a downlink control information according to a nesting disabled state and outputting a second portion of the downlink control information according to a nesting enabled state.

Some examples of the method, network entities, and non-transitory computer-readable medium described herein may further include operations, features, means, or instructions for obtaining, from the UE, a message requesting activation or deactivation of the nesting state.

Some examples of the method, network entities, and non-transitory computer-readable medium described herein may further include operations, features, means, or instructions for obtaining, from the UE, a message requesting switching between a first nesting state and a second nesting state.

Some examples of the method, network entities, and non-transitory computer-readable medium described herein may further include operations, features, means, or instructions for obtaining, from the UE, a message indicating support for nesting operations with the SSS.

Some examples of the method, network entities, and non-transitory computer-readable medium described herein may further include operations, features, means, or instructions for outputting, to the UE, a message requesting a preferred nesting state of the UE and obtaining, from the UE, the preferred nesting state according to the message.

DETAILED DESCRIPTION

Wireless networks may apply control channel nesting operations to reduce user equipment (UE) power consumption and complexity during blind decoding operations. For example, the nesting operations may include control channel elements (CCEs) associated with a lower aggregation level (AL) (e.g., fewer CCEs) being nested within the CCEs associated with a higher AL (e.g., more CCEs). Another power saving technique may include control channel skipping where the UE skips performing the blind decoding operations during some control channel monitoring occasions (e.g., only performs blind decoding operations every X'th monitoring occasion, where X is a positive integer of two or more). While such techniques may provide some power saving results for the UE, they are also associated with various drawbacks. For example, CCE nesting may limit the number of UEs that can be scheduled during a control channel monitoring occasion (e.g., which may be referred to as blocking). Moreover, control channel skipping may increase the latency associated with UE scheduling.

Accordingly, the described techniques various enhancements for nesting operations based on various wireless communication parameters of a UE. For example, a network entity may transmit or otherwise output an indication of a nesting state to a UE. The nesting state may be for a search space set (SSS) of a control channel (e.g., a physical downlink control channel (PDCCH)). The SSS may generally define the frequency resources (e.g., the CCEs) within the control channel that the UE is to search for a control message (e.g., a downlink control information (DCI)). However, the nesting state may generally correspond to various wireless communication parameters of or otherwise associated with the UE. For example, the wireless communications parameters may include, but are not limited to, control channel switching, SSS group switching, a discontinuous reception (DRX) or wakeup signal (WUS) configuration, or other wireless communication parameters of the UE. Accordingly, the UE may search the CCEs of the SSS for a control message according to the nesting state. For example, the UE may receive or otherwise obtain the control message via the control channel based on a result of the searching.

Aspects of the disclosure are initially described in the context of wireless communications systems. Aspects of the disclosure are further illustrated by and described herein with reference to apparatus diagrams, system diagrams, and flowcharts that relate to nested search space enhancements.

Figure 1:
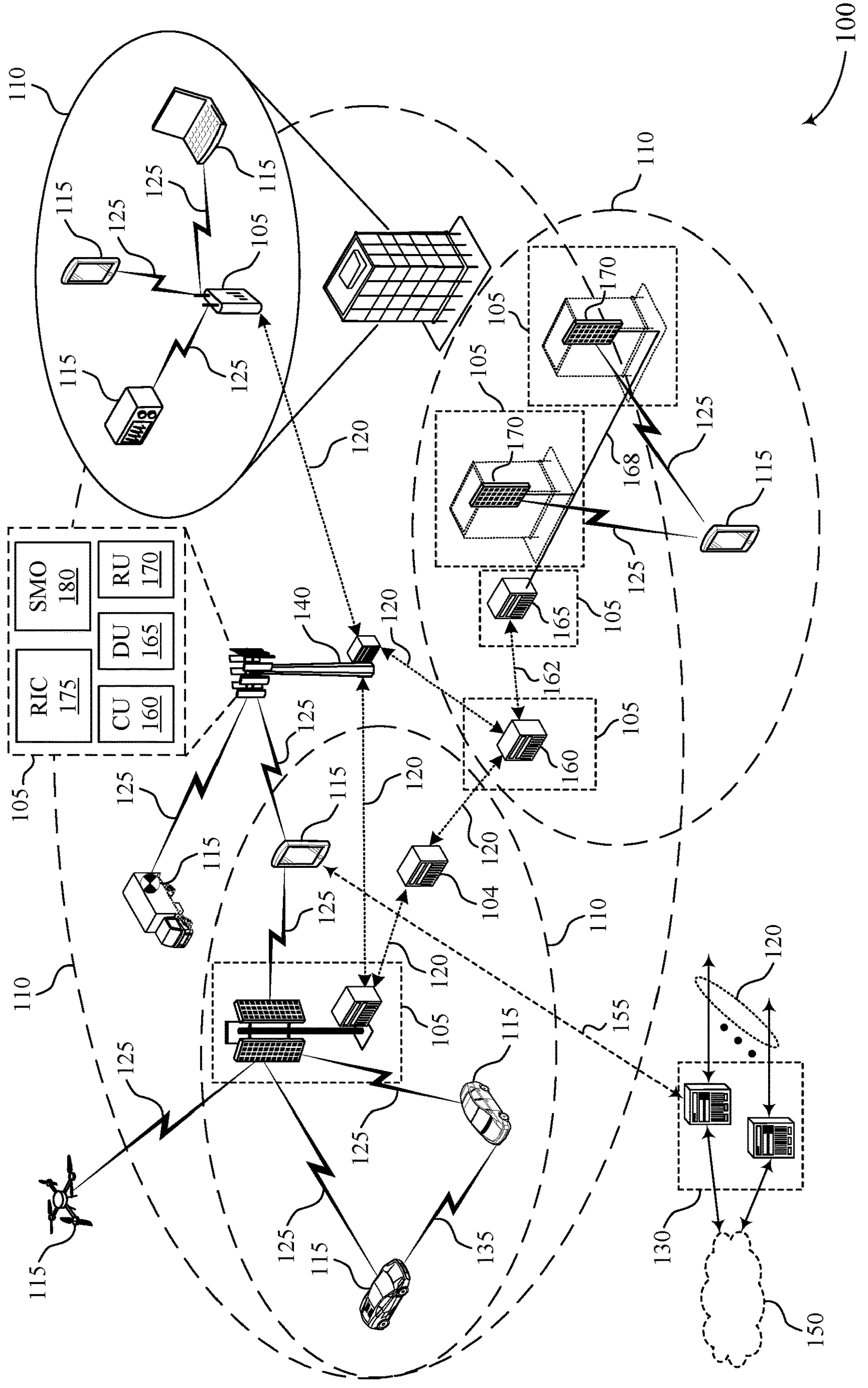
FIG. 1 shows an example of a wireless communications system that supports nested search space enhancements in accordance with one or more aspects of the present disclosure.

FIG. 1 shows an example of a wireless communications system 100 that supports nested search space enhancements in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more SSSs, and each SSS may include one or multiple control channel candidates in one or more ALs arranged in a cascaded manner. An AL for a control channel candidate may refer to an amount of control channel resources (e.g., CCEs) associated with encoded information for a control information format having a given payload size. SSSs may include common search space sets configured for sending control information to UEs 115 (e.g., one or more UEs) or may include UE-specific SSSs for sending control information to a UE 115 (e.g., a specific UE).

A network entity 105 may provide communication coverage via one or more cells, for example a macro cell, a small cell, a hot spot, or other types of cells, or any combination thereof. The term “cell” may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described herein with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may obtain an indication of a nesting state for a SSS of a control channel, wherein the nesting state corresponds to one or more wireless communication parameters of the UE 115. The UE 115 may search one or more CCEs of the SSS for a control message according to the nesting state. The UE 115 may obtain the control message via the control channel based at least in part on a result of the searching.

A network entity 105 may output, to a UE 115, an indication of a nesting state for a SSS of a control channel, wherein the nesting state corresponds to one or more wireless communication parameters of the UE 115 and indicates that the UE 115 is to search one or more CCEs of the SSS for a control message according to the nesting state. The network entity 105 may output, to the UE 115, the control message via the control channel in accordance with the nesting state.

Figure 2:
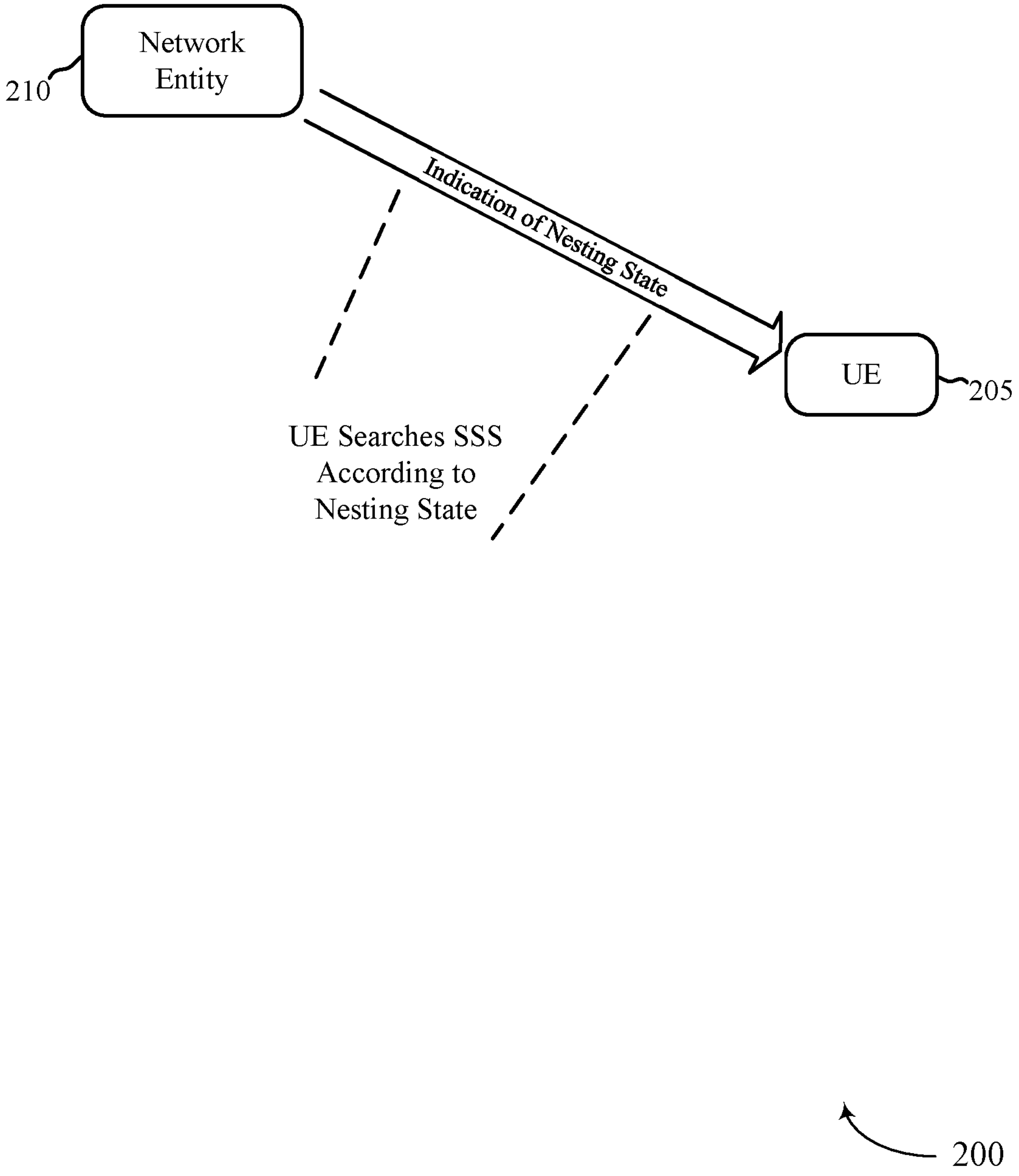
FIG. 2 shows an example of a wireless communications system that supports nested search space enhancements in accordance with one or more aspects of the present disclosure.

FIG. 2 shows an example of a wireless communications system 200 that supports nested search space enhancements in accordance with one or more aspects of the present disclosure. Wireless communications system 200 may implement aspects of wireless communications system 100. Wireless communications system 200 may include a UE 205 and a network entity 210, which may be examples of the corresponding devices described herein.

Wireless networks generally use a control channel (e.g., a PDCCH) to manage aspects of the wireless communications between the UE 205 and the network entity 210. The control channel may include a control region or a control resource set (CORESET) defined that includes time-frequency resources allocated for the UE 205 to monitor or otherwise search for a control message (e.g., DCI). For example, the smallest allocatable units of the control channel are resource elements (REs) that include one subcarrier or tone during one OFDM symbol. A resource block (RB) may be defined as a resource element group (REG) that includes twelve REs in the frequency domain in one OFDM symbol in the time domain. Multiple REGs may be grouped together into a REG bundle where the REG bundle size is defined by the RRC parameter REG bundle size. A CCE may be made up of multiple REGs where the number of REG bundles within a CCE may vary. An AL may be used that generally defines the number of CCEs allocated for a PDCCH. For example, an AL of one (AL 1) corresponds to one CCE, an AL of two (AL 2) corresponds to two CCEs, an AL of four (AL 4) corresponds to four CCEs, and so forth. The control region or CORESET may generally define multiple RBs in the frequency domain and a (pre)defined number of initial OFDM symbols within a slot.

The UE 205 generally monitors the CCEs within the control channel (e.g., in what may be referred to as the SSS) during monitoring occasions according to the AL in order to determine whether the PDCCH carries a control message (e.g., DCI) for the UE 205. For example, the DCI generally carries or otherwise conveys information used by the wireless network to schedule, allocate or otherwise convey information to the UE 205 associated with the wireless communications between the UE 205 and the network entity 210. However, the UE 205 is not aware of whether the CORESET region during a specific slot carries scheduling information for the UE 205. Accordingly, the UE 205 may perform PDCCH blind searching and DCI decoding operations in the SSS during each slot to determine whether it has scheduling information being conveyed from the network entity 210. This trial and error approach to blind searching and DCI decoding operations is a substantial burden on the UE 205. For example, this approach results in the UE 205 using a considerable amount of its available battery power to check each CORESET region during each slot. That is, there is a large power consumption burden associated with the UE 205 blind PDCCH searching and DCI decoding attempts.

To alleviate this power consumption burden of the UE 205, some wireless networks may use a nested SSS. A nested SSS generally has the CCEs for a lower AL fully contained in the CCEs of a larger AL. For example, an AL 16 SSS (e.g., 16 CCEs in the SSS) may include the CCEs associated with an AL 8, an AL 4, an AL 2, or an AL 1 being nested within those 16 CCEs. This generally reduces the number of CCEs that the UE 205 needs to search for the DCI message carried on the PDCCH. This may simplify the channel estimation performed by the UE 205 but does not impact decoding complexity. One drawback to strict SSS nesting is increased blocking where the number of UEs that can be scheduled are limited by the overlap (e.g., the nesting) of the CCEs. Within a given slot scheduling window, a UE is considered blocked if it cannot be scheduled on any resource within that slot for PDCCH arrival.

Another approach to alleviate the power consumption burden of the UE 205 may include PDCCH skipping. This may include the UE only monitoring the SSS every Y slots or monitoring occasions for PDCCH. The periodicity of the PDCCH skipping may be managed by the network and may be changed using various techniques. However, one drawback to PDCCH skipping is an increase in scheduling latency. For example, the PDCCH skipping with a periodicity of four slots may include the UE 205 performing blind PDCCH searching and DCI decoding during a first slot and then skipping the next three slots. The UE 205 cannot be scheduled during those three slots, which may impact latency-sensitive wireless communications with the UE 205.

While both approaches may provide some benefit regarding UE power savings, each approach may also include various drawbacks for the UE 205. Accordingly, aspects of the techniques described herein generally provide enhanced nesting operations and sparse PDCCH skipping. Aspects of the described techniques may include a nesting state being associated with or otherwise corresponding to one or more wireless communication parameters of the UE 205. As one example, the nesting state of the SSS may be associated with a PDCCH skipping duration (e.g., the periodicity of the PDCCH skipping duration). Another example may include the nesting state of the SSS being associated with a SSS group (SSSG) switching configuration. Another example may include the nesting state of the SSS being associated with a DRX or WUS configuration of the UE 205. Another example may include the nesting state of the SSS being associated with hashing operations of the UE 205. Aspects of the described techniques may include a mixture of nested and non-nested SSSs. Another example may include the nesting state of the SSS being associated with cross-carrier scheduling. Another example may include the nesting state of the SSS being associated with a network configured nested or non-nested SSS. Another example may include the nesting state of the SSS being associated with a UE-requested nested or non-nested SSS. Aspects of the described techniques may also include or be based on a capability of the UE 205.

For example, the UE 205 may receive or otherwise obtain an indication of a nesting state for a SSS of a control channel (e.g., a PDCCH). The nesting state may indicate or otherwise provide information identifying whether the CCEs within the SSS are nested (e.g., in a nesting enabled state) or are non-nested (e.g., in a nesting disabled state). The SSS may correspond to the CCEs that the UE 205 is to search for a control message (e.g., a DCI). Accordingly, the UE 205 may search the CCEs (e.g., one or more CCEs depending on the AL associated with the SSS) for the control message. The UE 205 may receive or otherwise obtain the control message via the control channel based on the searching. For example, the UE 205 may perform blind searching of the PDCCH and attempt to successfully decode a DCI message (e.g., using an identifier associated with the UE 205). If the UE 205 successfully decodes the DCI (e.g., based on a CRC passing), this may indicate that the control message is for the UE 205 (e.g., rather than being a DCI addressed to a different UE). The UE 205 and the network entity 210 may perform wireless communications according to the DCI.

As discussed, various communication parameter(s) may be used that correspond to the nesting state. That is, in some examples the UE 205 may not explicitly receive an indication of the nesting state from the network entity 210. Instead, configuration of the communication parameter(s) may provide the indication of whether the CCEs of the SSS are nested or are non-nested. That is, configuration of the communication parameter(s) may be sufficient to indicate or otherwise identify to the UE 205 whether the CCEs of the SSS are nested or are non-nested.

One non-limiting example of the communication parameters may be based on DRX/WUS operations of the UE 205. That is, one communication parameter may be a DRX state that defines DRX ON periods where the UE 205 is in an active state and DRX OFF periods where the UE 205 is in an inactive state. In some examples, this may include the UE 205 operating in a nesting disabled state (e.g., the CCEs are not nested, the nesting state is a non-nested state) during the DRX ON periods and in a nested enabled state (e.g., the CCEs are nested, the nesting state is a nested state) during the DRX OFF periods. That is, the UE 205 receiving or otherwise obtaining an indication of a DRX state (e.g., a DRX configuration) may indicate that the CCEs are nested during the DRX OFF periods and are not nested during the DRX ON periods, or vice versa.

In some examples, this may include the UE 205 operating in a first nesting state based on a DRX inactivity timer duration that satisfies a threshold and in a second nesting state based on the DRX inactivity timer failing to satisfy the threshold. The first nesting state and the second nesting state may be different nesting states. For example, the first nesting state may be a nesting enabled state or a nesting disabled state. This may include the nesting state being enabled if the DRX inactivity timer is longer than a threshold or being disabled if the DRX inactivity timer is shorter than the threshold, or vice versa.

In some examples, this may include the UE 205 operating in a first nesting state based on a DRX periodicity that satisfies a threshold and in a second nesting state based on the DRX periodicity failing to satisfy the threshold. The first nesting state and the second nesting state may be different nesting states. For example, the first nesting state may be a nesting enabled state or a nesting disabled state. This may include the nesting state being enabled for a short duration DRX periodicity (e.g., to support bursty traffic) while being disabled for a long duration DRX periodicity, or vice versa.

In some examples, this may include the UE 205 operating in a first nesting state based on a first type of DRX and in a second nesting state based on a second type of DRX. The first nesting state and the second nesting state may be different nesting states. For example, the first nesting state may be a nesting enabled state or a nesting disabled state. This may include the nesting state being based on the type of DRX configuration associated with the UE 205. Different types of DRX configurations may include a unicast DRX type, a multicast DRX type, or a cell-specific DRX type. For example, the nesting state may be a nesting enabled state for a unicast DRX type and in a nesting disabled state for a multicast or cell-specific DRX type, or vice versa.

In some aspects, a WUS may be used to indicate to the UE 205 whether the UE 205 is to wake up for or ignore the upcoming DRX ON period. In some examples, the WUS may be used to indicate the nesting state to the UE 205. For example, one or more bits may be included in the WUS that indicates whether nesting operations are associated with the upcoming DRX ON period, for subsequent wireless communications, or for other periods or functions.

Another non-limiting example of the communication parameters may be based on hashing function enhancements for a nested SSS. For example, a SSS associated with an AL 16 (e.g., 16 CCEs) may be hashed pseudo-randomly. In the case with one AL 16 being configured and those 16 CCEs are determined based on this hashing, different hashing options may be applied for lower level ALs (e.g., AL 1, Al 2, AL 4, or AL 8). One option may be a hard-division operation where, for AL x, there may be 16/x possibilities (e.g., two possibilities for AL 8). For example, the nesting state of the UE 205 may be a nesting enabled state where the UE 205 performs a first hashing operation for the SSS in a first set of CCEs associated with a first AL and a second hashing operation for the SSS in a second set of CCEs associated with a second AL. The second AL may be a lower AL (e.g., the first AL may be an AL 16 while the second AL may be an AL 1, AL 2, AL4, or AL 8). The quantity of CCEs in the second set of CCEs may be based on CCEs in the first set of CCEs. The quantity of hashing operations in the second hashing operation in the second set of CCEs may be a divisible function (e.g., 16/x possibilities) based on CCEs in the first set of CCEs. The possibilities may be indexed and the hashing operations may be with respect to the indices.

In another option (e.g., a non-hard division case), for each AL where x is less than 16, there may be 16 possibilities (e.g., start CCE of AL x can be any of the 16 CCEs of the AL 16 with a cyclic/modulus operation). For example, the nesting state of the UE 205 may be a nesting enabled state where the UE 205 performs a first hashing operation for the SSS in a first set of CCEs associated with a first AL and a second hashing operation for the SSS in a second set of CCEs associated with a second AL. The second AL may be a lower AL (e.g., the first AL may be an AL 16 while the second AL may be an AL 1, AL 2, AL4, or AL 8). The quantity of CCEs in the second set of CCEs may be any quantity of CCEs in the first set of CCEs. The quantity of hashing operations in the second hashing operation in the second set of CCEs may correspond to any CCEs in the first set of CCEs. The hashing formula may be used except that the CCEs of a CORESET may be replaced with CCEs of AL 16 (which itself is determined based on a legacy hashing first).

Although the two examples discussed above include the first AL being an AL 16, it is to be understood that these hashing operation enhancements may be applicable for more than one AL 16 candidates.

Another non-limiting example of the communication parameters may be based on cross-carrier scheduling. That is, the nested/non-nested SSS may be associated with cross-carrier scheduling. For example, a first carrier (e.g., CC1) may be used to schedule communications on both the first carrier and a second carrier (e.g., CC2). CC2, in this example, is cross-carrier scheduled using CC1. Each scheduled CC may be configured with one AL 16 candidate (e.g., both are monitored on the scheduling CC, which is CC1 in this example). Accordingly, the SSS may be on a first carrier (CC1) that includes a first set of AL 16 CCEs associated with the first carrier and a second set of AL 16 CCEs associated with a second carrier (CC2) that is cross-carrier scheduled by the first carrier. The CCEs associated with a lower AL may be nested within the AL 16 CCEs of the first carrier or of the second carrier. That is, the first set of AL 16 CCEs, the second set of AL 16 CCEs, or both sets of AL 16 CCEs, may include one or more subset(s) of CCEs having a lower AL that are nested according to the nesting state. For example, AL 1, AL 2, AL4, or AL 8 of either scheduled CC1 or scheduled CC2 may be a subset of either the first or second AL 16 CCEs. In some examples, at least one subset of the one or more subsets in the first set of AL 16 CCEs or in the second set of AL 16 CCEs may schedule communications on the first carrier or on the second carrier. This may enable CCE sharing (e.g., on the scheduling CC) for cross-carrier scheduling.

Another non-limiting example of the communication parameters may be based on a network-configured nested SSS or non-nested SSS. For example, the UE 205 may receive or otherwise obtain an indication of the nesting state separately from the wireless communication parameters. The nested SSS or the non-nested SSS may be configured within one or more of each CORESET, each SSS, each SSSG, per BWP PDCCH configuration, per SSS type (e.g., non-nested for cell-specific SSS and nested or non-nested for UE-specific SSS, or vice versa), or based on overlapping SSSs (e.g., non-nested for overlapped SSS monitoring occasions and nested for non-overlapping SSS monitoring occasions or based on a number of overlapping SS monitoring occasions), or any combination thereof. In some examples, the network may send a second indication that activates or deactivates the nesting state. For example, the network may send RRC signaling, MAC-CE signaling, or DCI signaling that indicates whether the nested SSS or the non-nested SSS will be used.

As another example, the network may (pre)configure both nested SSS and non-nested SSS using RRC, MAC-CE, or DCI signaling and then active or deactivate the nested SSS or the non-nested SSS using MAC-CE or DCI signaling. In some examples, the network may use MAC-CE or DCI signaling to switch between a nested SSS and a non-nested SSS, or vice versa. For example, the UE 205 may receive a message requesting switching between a first nesting state to a second nesting state.

In some examples, two-stage DCI signaling may be used between the UE 205 and the network entity 210. In this example, the UE 205 may receive a first portion of a DCI according to a nesting disabled state and a second portion of the DCI according to a nesting enabled state. That is, the first stage of the DCI may be non-nested while the second stage of the DCI may be nested or the nesting state of the second stage of the DCI may be configurable for the UE 205.

Figure 3:
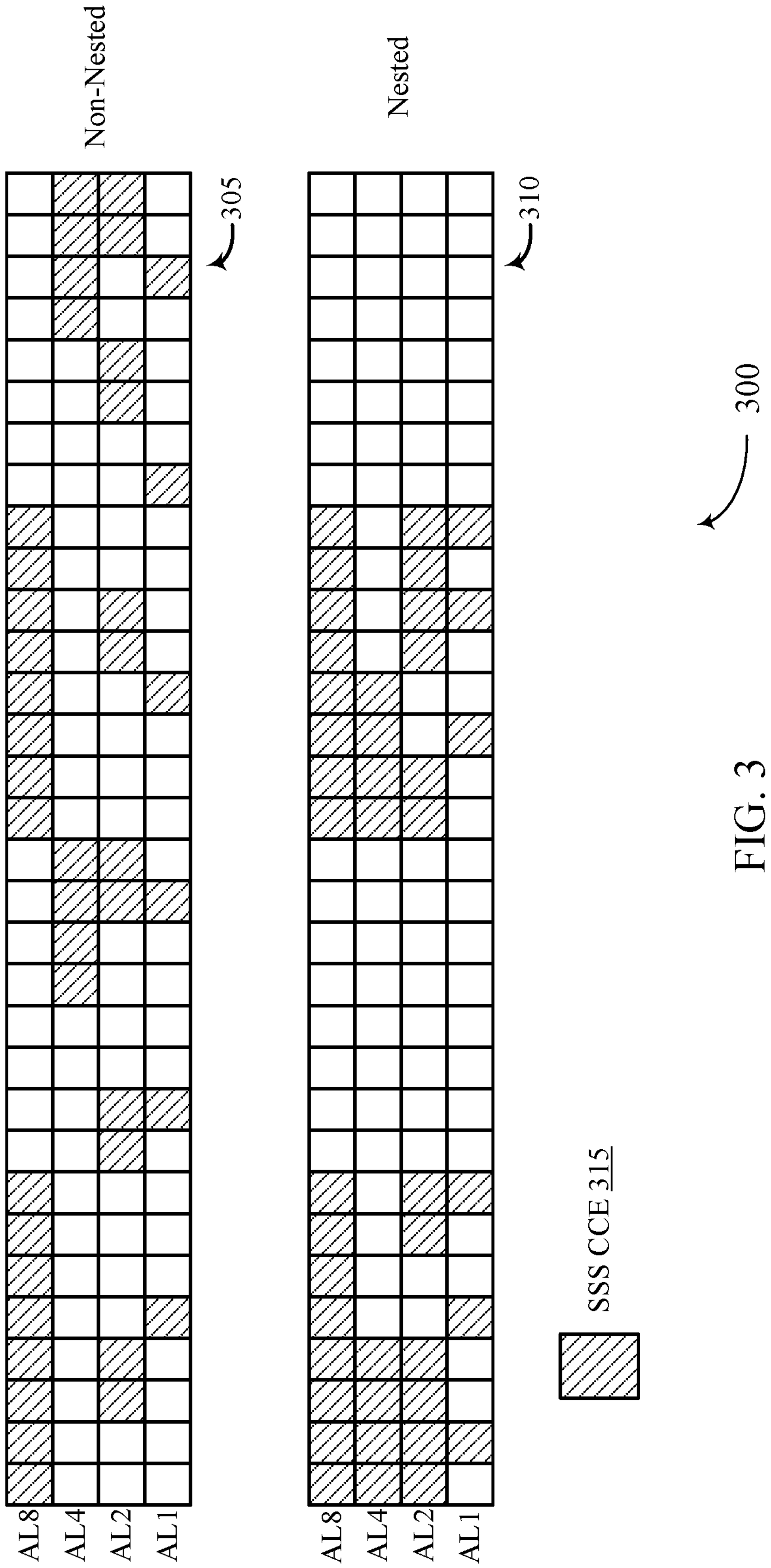
FIG. 3 shows an example of a nesting configuration that supports nested search space enhancements in accordance with one or more aspects of the present disclosure.

FIG. 3 shows an example of a nesting configuration 300 that supports nested search space enhancements in accordance with one or more aspects of the present disclosure. Nesting configuration 300 may implement aspects of wireless communications system 100 or wireless communications system 200. Aspects of nesting configuration 300 may be implemented at or implemented by a UE or a network entity, which may be examples of the corresponding devices described herein.

As discussed above, aspects of the described techniques generally associate a nesting state to one or more wireless communications parameters of a UE. The UE may search the CCEs of the SSS for a control message according to the nesting state. For example, the UE may receive or otherwise obtain the control message via the control channel based on a result of the searching. For example, the nesting state may correspond to a non-nested state 305 where nesting is disabled for the SSS or may correspond to a nested state 310 where nesting is enabled for the SSS. As shown, the nested state 310 may include one or more of the SSS CCE 315 associated with a lower level AL being nested within the SSS CCE 315 associated with a higher level AL. As shown in the nested state 310, this may include 16 of the SSS CCE 315 that are associated with an AL 16. There may be eight of the SSS CCE 315 that are associated with an AL 8 where the eight CCEs are nested within (e.g., overlap) with the AL 16 CCEs. Similarly, there may be four of the SSS CCE 315 that are associated with an AL 4 where the four CCEs are nested within the AL 16 CCEs. This may continue for the AL 4, the AL 2, and the AL 1 scenario where the CCEs of each lower level AL are nested with the CCEs of the 16 AL.

Nesting configuration 300 further illustrates a non-limiting example where the wireless communication parameter corresponds to a PDCCH skipping duration (e.g., a control channel skipping duration). For example, the 16 CCEs of the AL 16 SSS are divided into two groups of eight CCEs that are separated by eight CCEs that are not included in the SSS (e.g., the UE does not search these CCEs for a DCI). That is, the wireless communication parameters may include or otherwise correspond to a control channel skipping duration that identifies a quantity of SS monitoring occasions to skip during a set of one or more slots. In some examples, this may be based on an RRC parameter regarding the threshold of PDCCH skipping duration.

For example, the UE obtaining the indication of the skipping state (e.g., receive a control message from a network entity that indices a skipping state) may include or be based on a determination that the control channel skipping duration exceeds a threshold number of slots. The nesting state may be a nesting disabled state based on the control channel skipping duration exceeding the threshold number of slots. That is, when the configured PDCCH skipping duration is greater than the threshold, the nested SSS may be disabled. This approach may be based on a tradeoff between sparse PDCCH monitoring and reducing the PDCCH blocking probabilities.

Another approach for the UE to obtain the indication of the skipping state may include or be based on a determination that the control channel skipping duration has satisfied or is less than the threshold number of slots. The nesting state may be a nesting enabled state based on the control channel skipping duration satisfying or being less than the threshold number of slots. That is, when the configured PDCCH skipping duration is less than or equal to the threshold, the nested SSS may be enabled. This approach may be based on a tradeoff between dense PDCCH monitoring and a reduction of the number of CCEs to be used for the channel estimation.

Another approach for the UE to obtain the indication of the skipping state may include or be based on a determination that the control channel skipping duration exceeds the threshold number of slots. The nesting state may be a nesting enabled state based on the control channel skipping duration exceeding the threshold number of slots. That is, when the configured PDCCH skipping duration is greater than the threshold, the nested SSS may be enabled. This approach may be based on a tradeoff between sparse PDCCH monitoring for less-likely traffic and a reduction of the number of CCEs to be used for the channel estimation for additional power savings.

Another approach for the UE to obtain the indication of the skipping state may include or be based on a determination that the control channel skipping duration has satisfied or is less than the threshold number of slots. The nesting state may be a nesting disabled state based on the control channel skipping duration satisfying or being less than the threshold number of slots. That is, when the configured PDCCH skipping duration is less than or equal to the threshold, the nested SSS may be disabled. This approach may be based on a tradeoff between dense PDCCH monitoring and a further reduction of the PDCCH blocking probabilities.

Figure 4A:
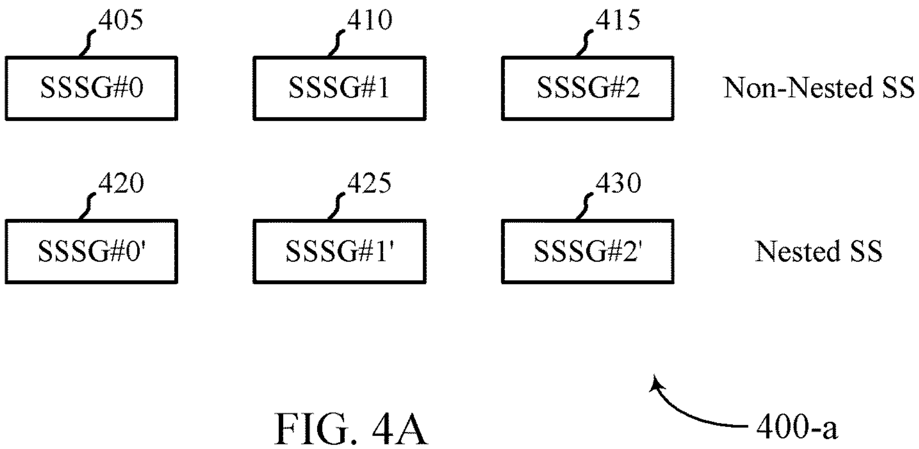
FIGS. 4A and 4B show examples of a nesting configuration that supports nested search space enhancements in accordance with one or more aspects of the present disclosure.
Figure 4B:
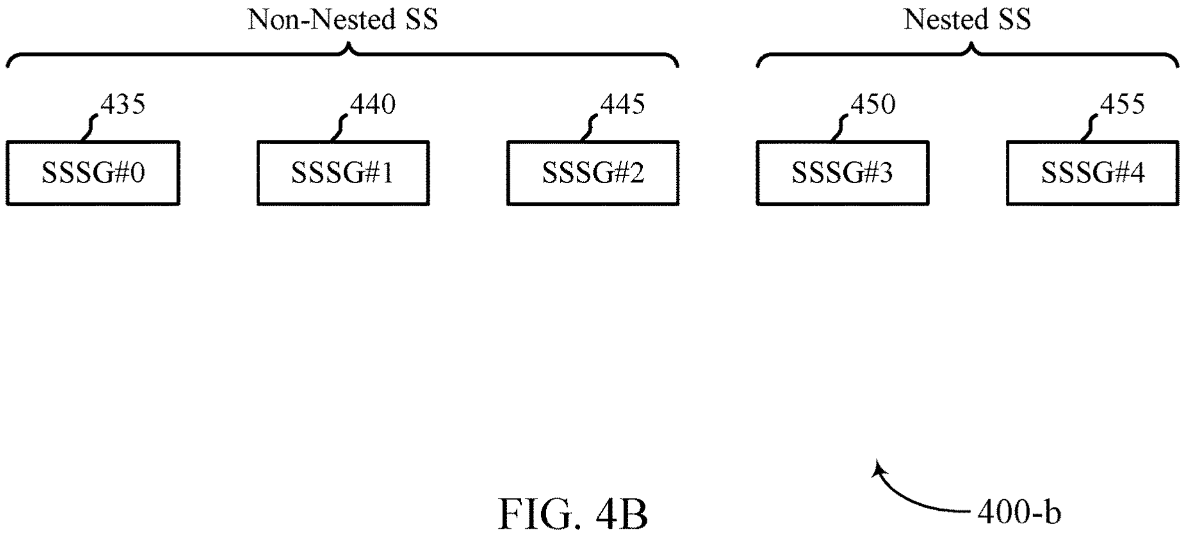

FIGS. 4A and 4B show examples of a nesting configuration 400 that supports nested search space enhancements in accordance with one or more aspects of the present disclosure. Nesting configuration 400 may implement aspects of wireless communications system 100 or wireless communications system 200 or aspects of nesting configuration 300. Aspects of nesting configuration 400 may be implemented at or implemented by a UE or a network entity, which may be examples of the corresponding devices described herein.

As discussed above, aspects of the described techniques generally associate a nesting state to one or more wireless communication parameters of a UE. The UE may search the CCEs of the SSS for a control message according to the nesting state. For example, the UE may receive or otherwise obtain the control message via the control channel based on a result of the searching.

Nesting configuration 400 illustrates a non-limiting example where the wireless communications parameters corresponds to a SSSG switching configuration. For example, the SSSG switching configuration may generally identify a set or group of SSSs for the UE to switch between. The nesting state for the SSS of the control channel may be based on or otherwise correspond to the SSSG switching configuration of the UE.

Nesting configuration 400-*a* of FIG. 4A illustrates a non-limiting example of the UE obtaining the indication of the nesting state based on the UE receiving or otherwise obtaining information identifying a set of SSSG switching configurations. For example, the information identifying the set of SSSG switching configurations may include one or more bits or fields set to a value that identifies which SSSG switching configuration in the set is associated with a nesting enabled state. For example, there may be an SSSG #n' that is associated with a legacy SSSG #n, where the SSSG #n' corresponds to the nested version of SSSG #n. In this example, n may be less than N where N is the maximum number of SSSG configurations that can be configured for the UE. Some SSSG switching configuration signaling techniques may be applied but with the addition of one bit being used to indicate whether nesting is enabled or disabled for that SSSG switching configuration.

In the example shown in nesting configuration 400-*a*, the set of SSSG switching configurations may include six SSSG switching configurations. This may include three legacy non-nested SSSG switching configurations that can be configured for the UE and, with the additional bit, three new nested SSSG switching configurations that can be configured for the UE. For example, the three legacy SSSG switching configurations may include a SSSG switching configuration 405, a SSSG switching configuration 410, and a SSSG switching configuration 415, which may correspond to SSSG switching configurations #0, #1, and #2, respectively. These legacy SSSG switching configurations may be associated with a non-nested state where nesting is disabled for each SSS. However, one or more bits may be set to indicate which of these legacy SSSG switching configurations may be associated with a nested state where nesting is enabled for the SSS. For example, the three new SSSG switching configurations may include a SSSG switching configuration 420, a SSSG switching configuration 425, and a SSSG switching configuration 430, which may correspond to the SSSG switching configurations #0, #1, and #2, respectively, but with nesting enabled for those SSSs according to the additional bit.

Nesting configuration 400-*b* of FIG. 4B illustrates a non-limiting example of the UE obtaining the indication of the nesting state based on the UE receiving or otherwise obtaining information identifying a set or group of SSSG switching configurations. The set of SSSG switching configurations in this example may include a first subset of SSSG switching configuration(s) that are associated with a nesting enabled state and a second subset of SSSG switching configuration(s) that are associated with a nesting disabled state. That is, there may be some additional nesting SSSG #m configurations identified for the UE, where m is greater than the maximum number of legacy non-nested SSSG switching configurations. The number of nested SSSG and non-nested SSSG may be different, in some examples. This may enable more dynamically configured SSSG switching configurations directly with the UE.

In the example shown in nesting configuration 400-*b*, the set of SSSG switching configurations includes five SSSG switching configurations. The first subset of SSSG switching configurations that are associated with the nesting enabled state may include a SSSG switching configuration 450 and a SSSG switching configuration 455 while the second subset of SSSG switching configurations that are associated with the nesting disabled state may include a SSSG switching configuration 435, a SSSG switching configuration 440, and a SSSG switching configuration 445.

Figure 5:
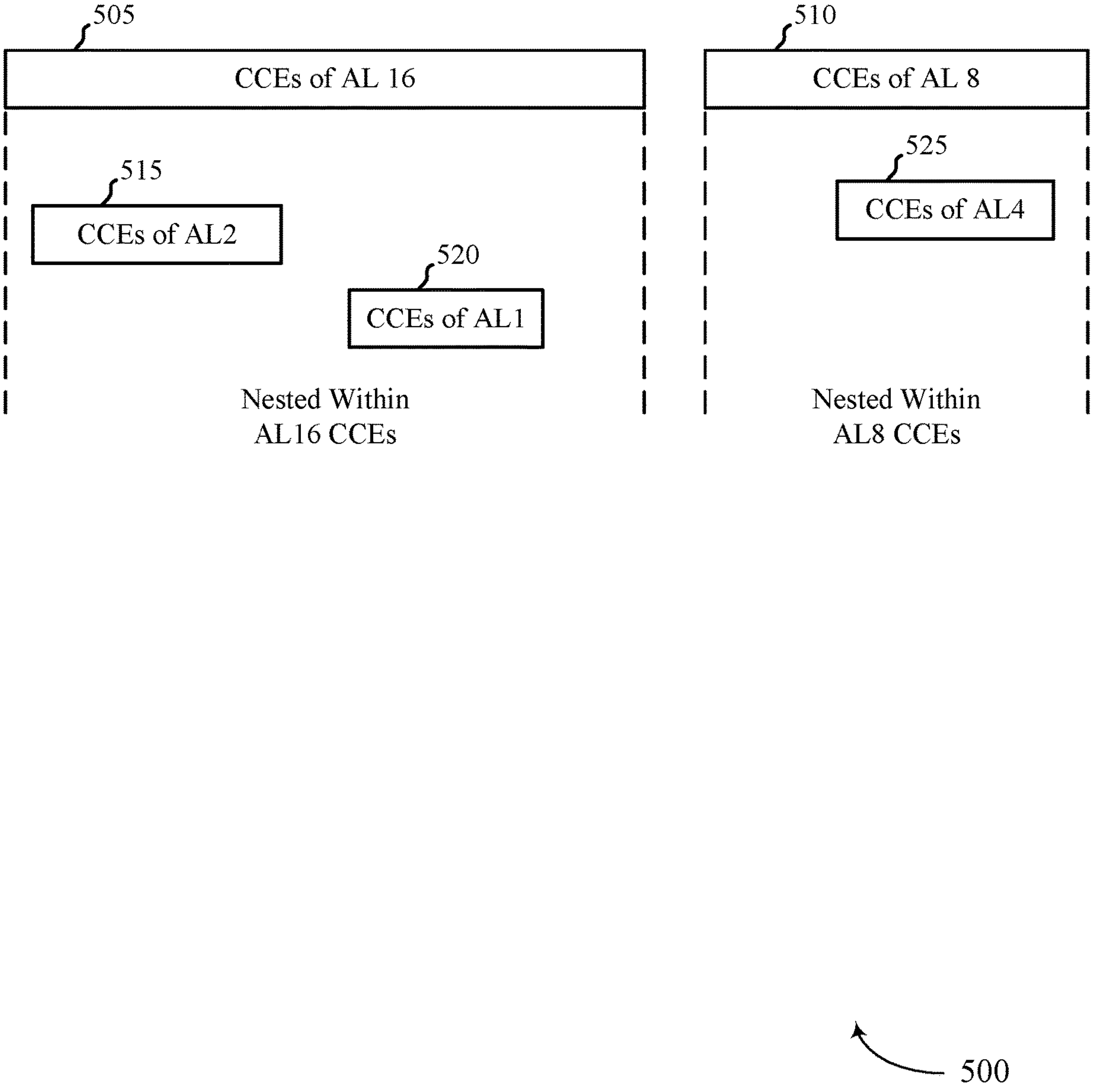
FIG. 5 shows an example of a nesting configuration that supports nested search space enhancements in accordance with one or more aspects of the present disclosure.

FIG. 5 shows an example of a nesting configuration 500 that supports nested search space enhancements in accordance with one or more aspects of the present disclosure. Nesting configuration 500 may implement aspects of wireless communications system 100 or wireless communications system 200 or aspects of nesting configuration 300 or nesting configuration 400. Aspects of nesting configuration 500 may be implemented at or implemented by a UE or a network entity, which may be examples of the corresponding devices described herein.

As discussed above, aspects of the described techniques generally associate a nesting state to one or more wireless communication parameters of a UE. The UE may search the CCEs of the SSS for a control message according to the nesting state. For example, the UE may receive or otherwise obtain the control message via the control channel based on a result of the searching.

Nesting configuration 500 illustrates a non-limiting example where the wireless communications parameters corresponds to a mixture of nested and non-nested SSSs. That is, nesting configuration 500 supports a mixture of nested SSSs and non-nested SSSs which may mitigate the increased blocking probability while still benefiting from the limited number of CCEs (e.g., sixteen plus eight CCEs in this non-limiting example). For example, the SSS may include a first quantity of CCEs 505 and a second quantity of CCEs 510. The CCEs in the first quantity of CCEs 505 do not overlap with the CCEs in the second quantity of CCEs 510. The first quantity of CCEs 505 are associated with a nesting enabled state. The second quantity of CCEs 510 may be associated with the nesting enabled state (as shown in FIG. 5) or with a nesting disabled state.

As one example for a given SSS, CCEs associated with AL 1 and AL 2 may be nested within the CCEs associated with AL 16 while CCEs associated with AL 4 and AL 8 may be nested but not nested with respect to the CCEs of the AL 1, AL 2, and AL 16. For example, SSS CCEs 515 associated with AL 2 and SSS CCEs 520 associated with AL 1 are nested within the CCEs associated with the first quantity of CCEs 505 that is associated with the AL 16. The SSS CCEs 525 are nested (in this example) within the CCEs associated with the second quantity of CCEs 510 that are associated with the AL 8.

As another example for a given SSS, CCEs associated with Al 1 and AL 2 may be nested within the CCEs associated with an AL 16 while the CCEs associated with AL 4 may not be nested within the CCEs associated with the AL 8. As yet another example for a given SSS, CCEs associated with AL 1 and AL2 may not be nested with respect to the CCEs associated with an AL 16 while the CCEs associated with an AL 4 may be nested within the CCEs associated with an AL 8.

These techniques may support a trade-off between a nested enabled state for AL 1, AL 2, AL 4, AL 8, and AL 16 with respect to nested AL 1, AL 2, AL 16 and nested AL 4 and AL 8.

Figure 6:
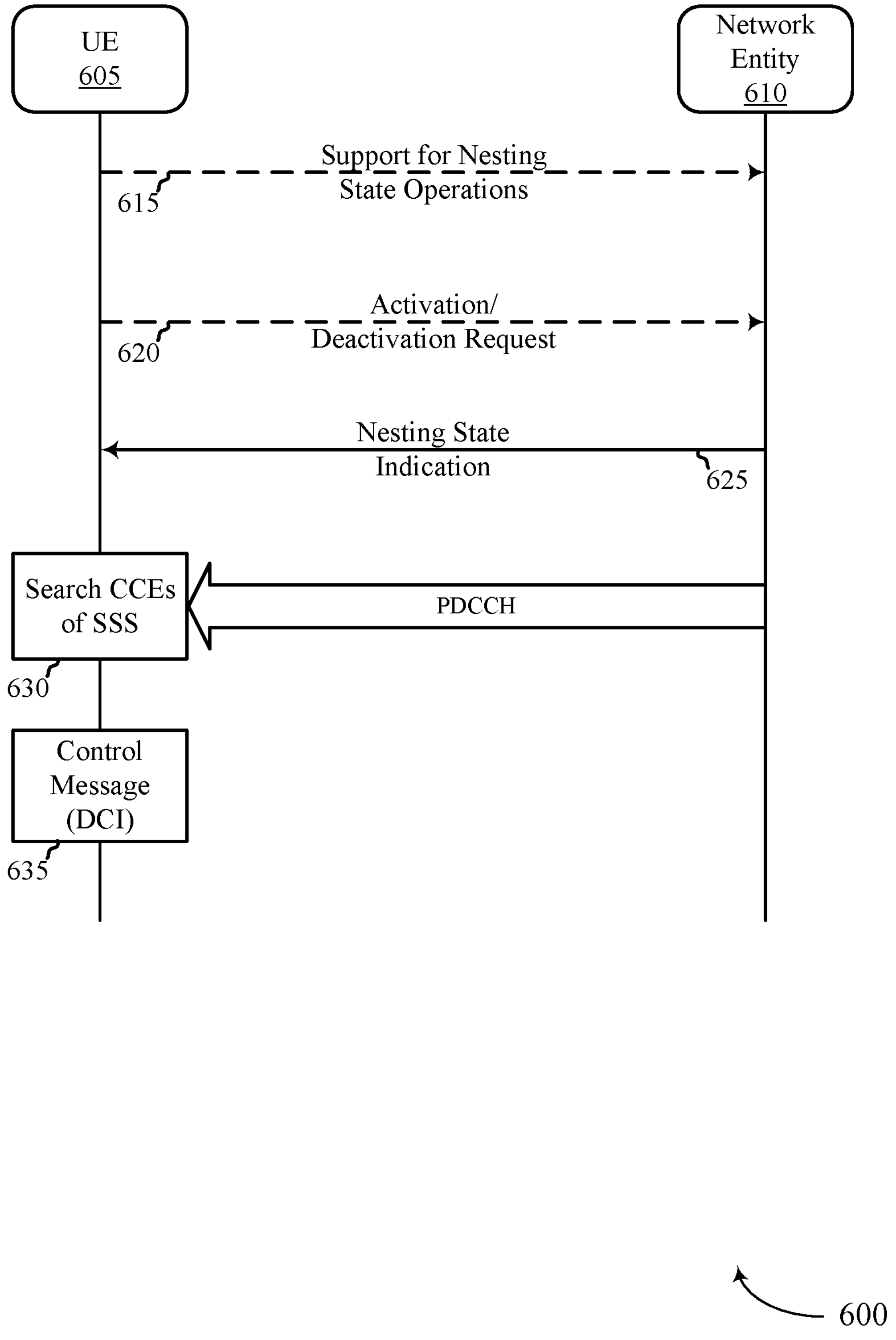
FIG. 6 shows an example of a swim diagram that supports nested search space enhancements in accordance with one or more aspects of the present disclosure.

FIG. 6 shows an example of a swim diagram 600 that supports nested search space enhancements in accordance with one or more aspects of the present disclosure. Swim diagram 600 may implement aspects of wireless communications system 100 or wireless communications system 200 or aspects of nesting configuration 300, nesting configuration 400, or nesting configuration 500. Aspects of swim diagram 600 may be implemented at or implemented by a UE 605 or a network entity 610, which may be examples of the corresponding devices described herein.

Swim diagram 600 illustrates a non-limiting example of UE-requested nested SSS or non-nested SSS and UE capability signaling supporting the enhanced nesting operations described herein. Broadly, this may include the UE 605 requesting the network to configure a nested SSS or a non-nested SSS (e.g., using UE assistance information (UAI) signaling). This may include the UE 605 requesting the network to switch between a nested SSS and a non-nested SSS (e.g., using UAI signaling), or vice versa. This may include the UE 605 being indicated to report is capability whether it supports nested SSS operations. This may include the UE 605 being indicated to report its preferred SSS configuration (e.g., nested or non-nested).

For example, at 615 the UE 605 may optionally transmit or otherwise provide (and the network entity 610 may receive or otherwise obtain) a message indicating support for nesting operations within the SSS. The message may be transmitted using uplink signaling, such as in a UE capability message, UAI, or other uplink signaling. The message may carry or otherwise convey information identifying whether the UE 605 can perform blind PDCCH searching and DCI message decoding in a nested SSS.

At 620, the UE 605 may optionally transmit or otherwise provide (and the network entity 610 may receive or otherwise obtain) a message requesting activation or deactivation of a nesting state for the UE 605. The message may be transmitted using various uplink signaling, such as in a UAI message.

At 625, the network entity 610 transmit or otherwise provide (and the UE 605 may receive or otherwise obtain) an indication of the nesting state for the SSS of a control channel. The nesting state may correspond to one or more wireless communication parameters of the UE 605, as discussed above. For example, the nesting state may be based or otherwise correspond to a control channel skipping duration, a SSSG switching configuration, or other wireless communication parameters discussed above.

In some examples, the UE 605 may have requested the nesting state from the network entity 610. For example, the UE 605 may have previously received a message requesting a preferred nesting state of the UE 605 and the UE 605 may have responded by transmitting an indication of the preferred nesting state to the network entity 610. The nesting state indicated at 625 may be based on the preferred nesting state of the UE 605.

At 630, the UE 605 may search the CCE(s) of the SSS for a control message according to the nesting state. For example, the UE 605 may search nested CCEs within the SSS when the nesting state is a nesting enabled state or may search non-nested CCEs within the SSS when the nesting state is a nesting disabled state.

At 635, the UE 605 may receive or other obtain (and the network entity 610 may transmit or otherwise provide) the control message (e.g., DCI) via the control channel (e.g., PDCCH) based on a result of the searching performed at 630. For example, the UE 605 may pass a CRC for a DCI received in the SSS that indicates the DCI is addressed to the UE 605.

Figure 7:
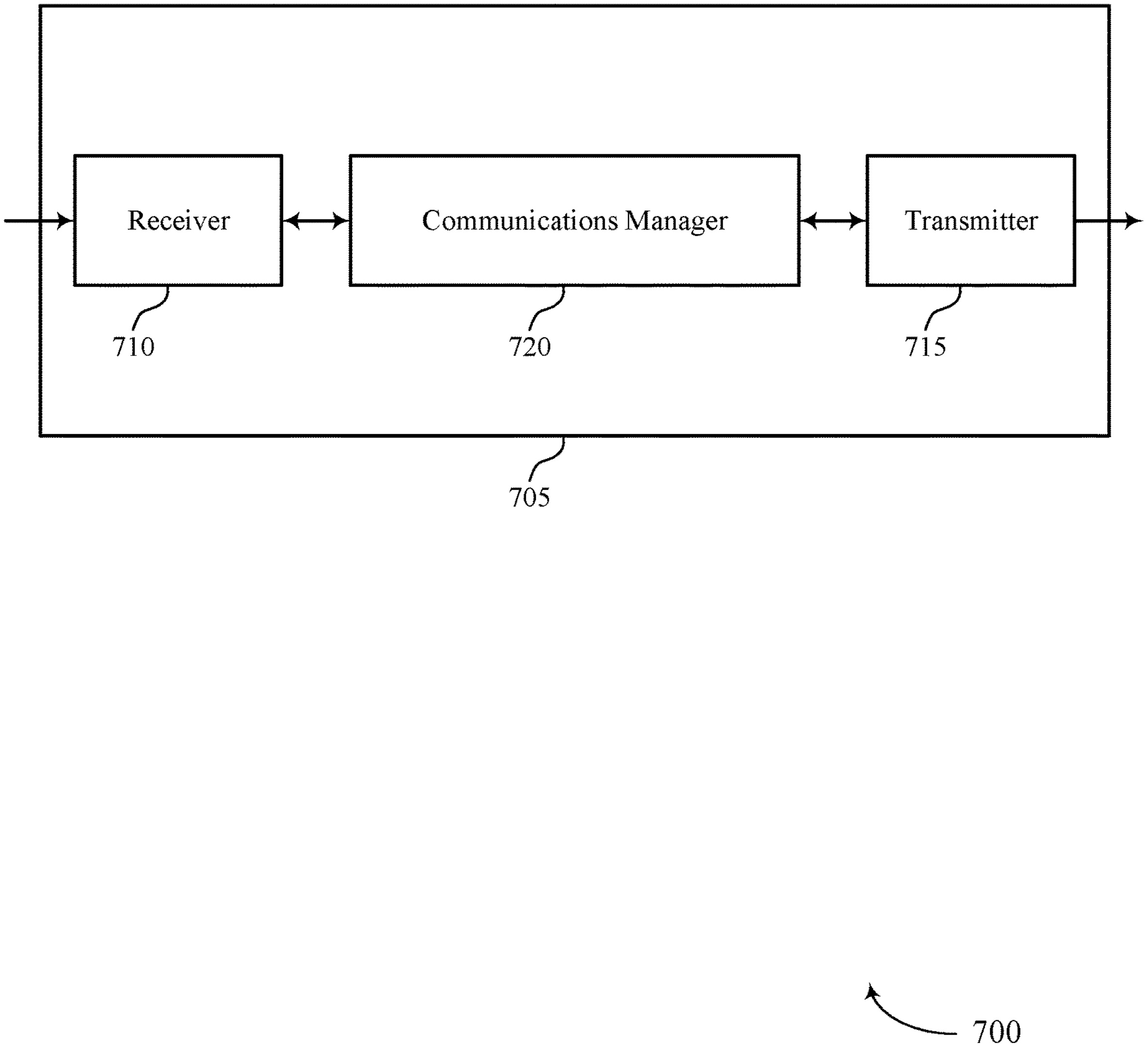
FIGS. 7 and 8 show block diagrams of devices that support nested search space enhancements in accordance with one or more aspects of the present disclosure.

FIG. 7 shows a block diagram 700 of a device 705 that supports nested search space enhancements in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to nested search space enhancements). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to nested search space enhancements). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of nested search space enhancements as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for obtaining an indication of a nesting state for a SSS of a control channel, where the nesting state corresponds to one or more wireless communication parameters of the UE. The communications manager 720 is capable of, configured to, or operable to support a means for searching one or more CCEs of the SSS for a control message according to the nesting state. The communications manager 720 is capable of, configured to, or operable to support a means for obtaining the control message via the control channel based on a result of the searching.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for nesting operation enhancements that associate a nesting state of a UE with various wireless communication parameters of the UE.

Figure 8:
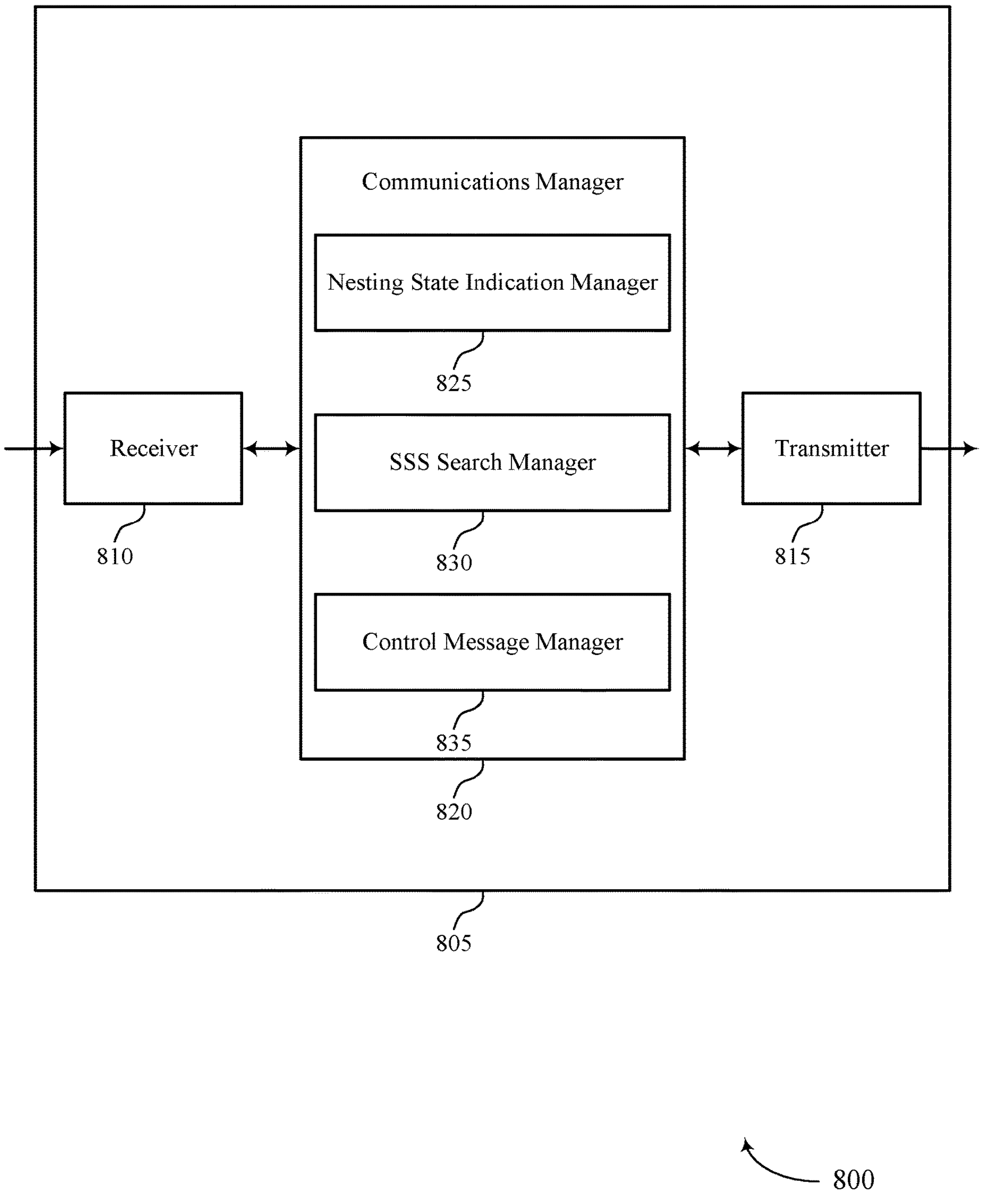

FIG. 8 shows a block diagram 800 of a device 805 that supports nested search space enhancements in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to nested search space enhancements). Information may be passed on to other components of the device 805. The receiver 810 may utilize a single antenna or a set of multiple antennas.

The transmitter 815 may provide a means for transmitting signals generated by other components of the device 805.

For example, the transmitter 815 may transmit information such as packets, user data, control information, or any combination thereof associated with various information channels (e.g., control channels, data channels, information channels related to nested search space enhancements). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of nested search space enhancements as described herein. For example, the communications manager 820 may include a nesting state indication manager 825, an SSS search manager 830, a control message manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The nesting state indication manager 825 is capable of, configured to, or operable to support a means for obtaining an indication of a nesting state for a SSS of a control channel, where the nesting state corresponds to one or more wireless communication parameters of the UE. The SSS search manager 830 is capable of, configured to, or operable to support a means for searching one or more CCEs of the SSS for a control message according to the nesting state. The control message manager 835 is capable of, configured to, or operable to support a means for obtaining the control message via the control channel based on a result of the searching.

Figure 9:
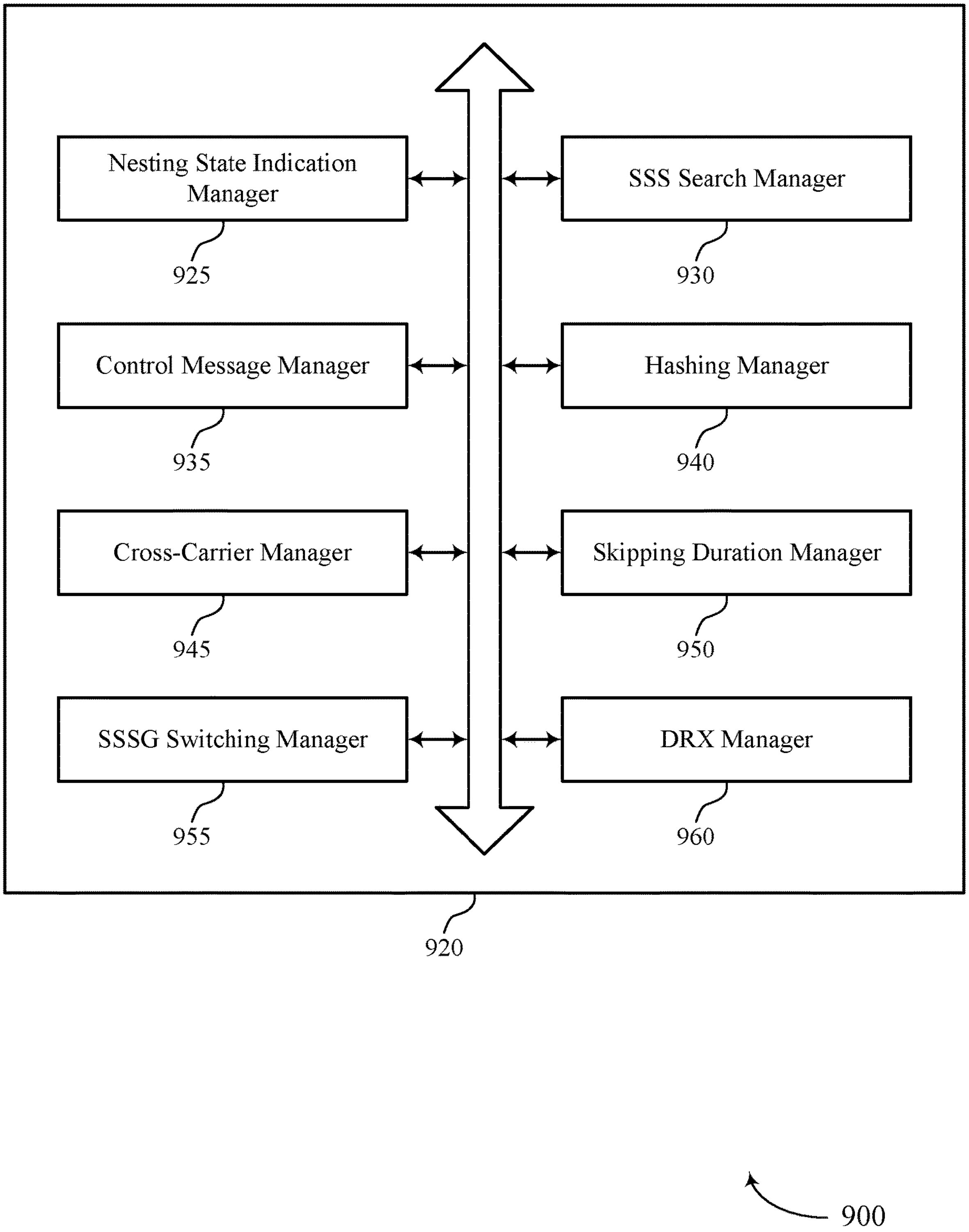
FIG. 9 shows a block diagram of a communications manager that supports nested search space enhancements in accordance with one or more aspects of the present disclosure.

FIG. 9 shows a block diagram 900 of a communications manager 920 that supports nested search space enhancements in accordance with one or more aspects of the present disclosure. The communications manager 920 may be an example of aspects of a communications manager 720, a communications manager 820, or both, as described herein. The communications manager 920, or various components thereof, may be an example of means for performing various aspects of nested search space enhancements as described herein. For example, the communications manager 920 may include a nesting state indication manager 925, an SSS search manager 930, a control message manager 935, a hashing manager 940, a cross-carrier manager 945, a skipping duration manager 950, an SSSG switching manager 955, a DRX manager 960, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The nesting state indication manager 925 is capable of, configured to, or operable to support a means for obtaining an indication of a nesting state for a SSS of a control channel, where the nesting state corresponds to one or more wireless communication parameters of the UE. The SSS search manager 930 is capable of, configured to, or operable to support a means for searching one or more CCEs of the SSS for a control message according to the nesting state. The control message manager 935 is capable of, configured to, or operable to support a means for obtaining the control message via the control channel based on a result of the searching.

In some examples, the one or more wireless communication parameters include a control channel skipping duration that identifies a quantity of search space monitoring occasions to skip during a set of one or more slots.

In some examples, to support obtaining the indication, the skipping duration manager 950 is capable of, configured to, or operable to support a means for determining that the control channel skipping duration exceeds a threshold number of slots, where the nesting state includes a nesting disabled state based on the control channel skipping duration exceeding the threshold number of slots.

In some examples, to support obtaining the indication, the skipping duration manager 950 is capable of, configured to, or operable to support a means for determining that the control channel skipping duration has satisfied or is less than a threshold number of slots, where the nesting state includes a nesting enabled state based on the control channel skipping duration satisfying or being less than the threshold number of slots.

In some examples, to support obtaining the indication, the skipping duration manager 950 is capable of, configured to, or operable to support a means for determining that the control channel skipping duration exceeds a threshold number of slots, where the nesting state includes a nesting enabled state based on the control channel skipping duration exceeding the threshold number of slots.

In some examples, to support obtaining the indication, the skipping duration manager 950 is capable of, configured to, or operable to support a means for determining that the control channel skipping duration has satisfied or is less than a threshold number of slots, where the nesting state includes a nesting disabled state based on the control channel skipping duration satisfying or being less than the threshold number of slots. In some examples, the one or more wireless communication parameters include a SSSG switching configuration that identifies a set of SSSs for the UE to switch between.

In some examples, to support obtaining the indication, the SSSG switching manager 955 is capable of, configured to, or operable to support a means for obtaining information identifying a set of SSSG switching configurations, where the information includes one or more bits that identify which of one or more SSSG switching configurations in the set of SSSG switching configurations is associated with a nesting enabled state.

In some examples, to support obtaining the indication, the SSSG switching manager 955 is capable of, configured to, or operable to support a means for obtaining information identifying a set of SSSG switching configurations, where the set of SSSG switching configurations include a first subset of one or more SSSG switching configurations that are associated with a nesting enabled state and a second subset of one or more SSSG switching configurations that are associated with a nesting disabled state.

In some examples, the one or more wireless communication parameters include a DRX state that defines DRX ON periods where the UE is in an active state and DRX OFF periods where the UE is in an inactive state. In some examples, to support obtaining the indication, the DRX manager 960 is capable of, configured to, or operable to support a means for operating in a nesting disabled state during the DRX ON periods and in a nesting enabled state during the DRX OFF periods.

In some examples, to support obtaining the indication, the DRX manager 960 is capable of, configured to, or operable to support a means for operating in a first nesting state based on a DRX inactivity timer duration satisfying a threshold and in a second nesting state based on the DRX inactivity timer duration failing to satisfy the threshold, where the first nesting state is different from the second nesting state, and where the first nesting state is a nesting enabled state or a nesting disabled state.

In some examples, to support obtaining the indication, the DRX manager 960 is capable of, configured to, or operable to support a means for operating in a first nesting state based on a DRX periodicity satisfying a threshold and in a second nesting state based on the DRX periodicity failing to satisfy the threshold, where the first nesting state is different from the second nesting state, and where the first nesting state is a nesting enabled state or a nesting disabled state.

In some examples, to support obtaining the indication, the DRX manager 960 is capable of, configured to, or operable to support a means for operating in a first nesting state based on a first type of DRX state and in a second nesting state based on a second type of DRX state, where the first nesting state is different from the second nesting state, and where the first nesting state is a nesting enabled state or a nesting disabled state.

In some examples, to support obtaining the indication, the DRX manager 960 is capable of, configured to, or operable to support a means for obtaining a wakeup signal prior to each DRX ON period, where the wakeup signal indicates the nesting state for the DRX ON period.

In some examples, the hashing manager 940 is capable of, configured to, or operable to support a means for performing a first hashing operation for the SSS in a first set of CCEs associated with a first AL. In some examples, the hashing manager 940 is capable of, configured to, or operable to support a means for performing a second hashing operation for the SSS in a second set of CCEs associated with a second AL that is a lower AL than the first AL, where a quantity of CCEs in the second set of CCEs is based on CCEs in first set of CCEs, and where a quantity of hashing operations in the second hashing operation in the second set of CCEs is a divisible function based on CCEs in the first set of CCEs.

In some examples, the hashing manager 940 is capable of, configured to, or operable to support a means for performing a first hashing operation for the SSS in a first set of CCEs associated with a first AL. In some examples, the hashing manager 940 is capable of, configured to, or operable to support a means for performing a second hashing operation for the SSS in a second set of CCEs associated with a second AL that is a lower AL than the first AL, where a quantity of CCEs in the second set of CCEs is any quantity of CCEs within the first set of CCEs, and where a quantity of hashing operations in the second hashing operation in the second set of CCEs corresponds to any CCEs in the first set of CCEs.

In some examples, the SSS includes a first quantity of CCEs that are associated with a nesting enabled state and a second quantity of CCEs that are associated with the nesting enabled state or a nesting disabled state. In some examples, the first quantity of CCEs are non-overlapping CCEs with the second quantity of CCEs.

In some examples, the SSS is on a first carrier and includes a first set of AL 16 CCEs associated with the first carrier and a second set of AL 16 CCEs associated with a second carrier that is cross-carrier scheduled by the first carrier. In some examples, the first set of AL 16 CCEs, the second set of AL 16 CCEs, or both, include one or more subsets of CCEs having a lower AL that are nested according to the nesting state. In some examples, at least one subset in the one or more subsets of CCEs in the first set of AL 16 CCEs, in the second set of AL 16 CCEs, or both, schedule communications on the first carrier or on the second carrier.

In some examples, to support obtaining the indication, the nesting state indication manager 925 is capable of, configured to, or operable to support a means for receiving the indication of the nesting state separately from the one or more wireless communication parameters.

In some examples, the nesting state indication manager 925 is capable of, configured to, or operable to support a means for receiving a second indication that activates or deactivates the nesting state. In some examples, the indication is received in an RRC message, a MAC-CE, a DCI, or any combination thereof.

In some examples, the one or more wireless communication parameters include a control resource set configuration, a SSS configuration, a SSS group configuration, a bandwidth part configuration, a search space type configuration, a search space overlap configuration, or any combination thereof.

In some examples, the control message manager 935 is capable of, configured to, or operable to support a means for receiving a first portion of a downlink control information according to a nesting disabled state. In some examples, the control message manager 935 is capable of, configured to, or operable to support a means for receiving a second portion of the downlink control information according to a nesting enabled state.

In some examples, the nesting state indication manager 925 is capable of, configured to, or operable to support a means for transmitting a message requesting activation or deactivation of the nesting state. In some examples, the nesting state indication manager 925 is capable of, configured to, or operable to support a means for transmitting a message requesting switching between a first nesting state and a second nesting state. In some examples, the nesting state indication manager 925 is capable of, configured to, or operable to support a means for transmitting a message indicating support for nesting operations with the SSS.

In some examples, the nesting state indication manager 925 is capable of, configured to, or operable to support a means for receiving a message requesting a preferred nesting state of the UE. In some examples, the nesting state indication manager 925 is capable of, configured to, or operable to support a means for transmitting the preferred nesting state according to the message.

Figure 10:
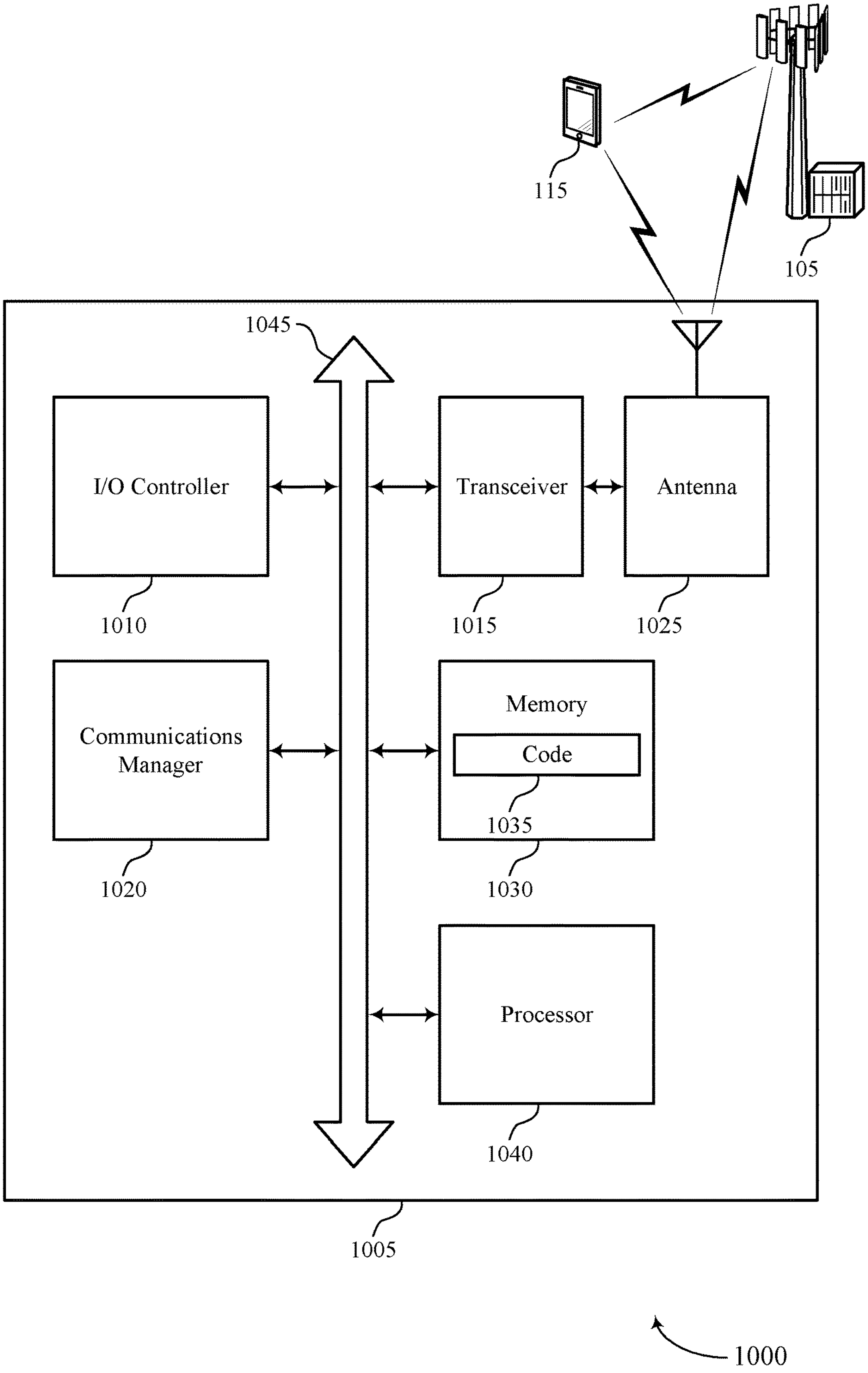
FIG. 10 shows a diagram of a system including a device that supports nested search space enhancements in accordance with one or more aspects of the present disclosure.

FIG. 10 shows a diagram of a system 1000 including a device 1005 that supports nested search space enhancements in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting nested search space enhancements). For example, the device 1005 or a component of the device 1005 may include at least one processor 1040 and at least one memory 1030 coupled with or to the at least one processor 1040, the at least one processor 1040 and the at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for obtaining an indication of a nesting state for a SSS of a control channel, where the nesting state corresponds to one or more wireless communication parameters of the UE. The communications manager 1020 is capable of, configured to, or operable to support a means for searching one or more CCEs of the SSS for a control message according to the nesting state. The communications manager 1020 is capable of, configured to, or operable to support a means for obtaining the control message via the control channel based on a result of the searching.

By including or configuring the communications manager 1020 in accordance with examples as described herein, the device 1005 may support techniques for nesting operation enhancements that associate a nesting state of a UE with various wireless communication parameters of the UE.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described herein with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of nested search space enhancements as described herein, or the at least one processor 1040 and the at least one memory 1030 may be otherwise configured to, individually or collectively, perform or support such operations.

Figure 11:
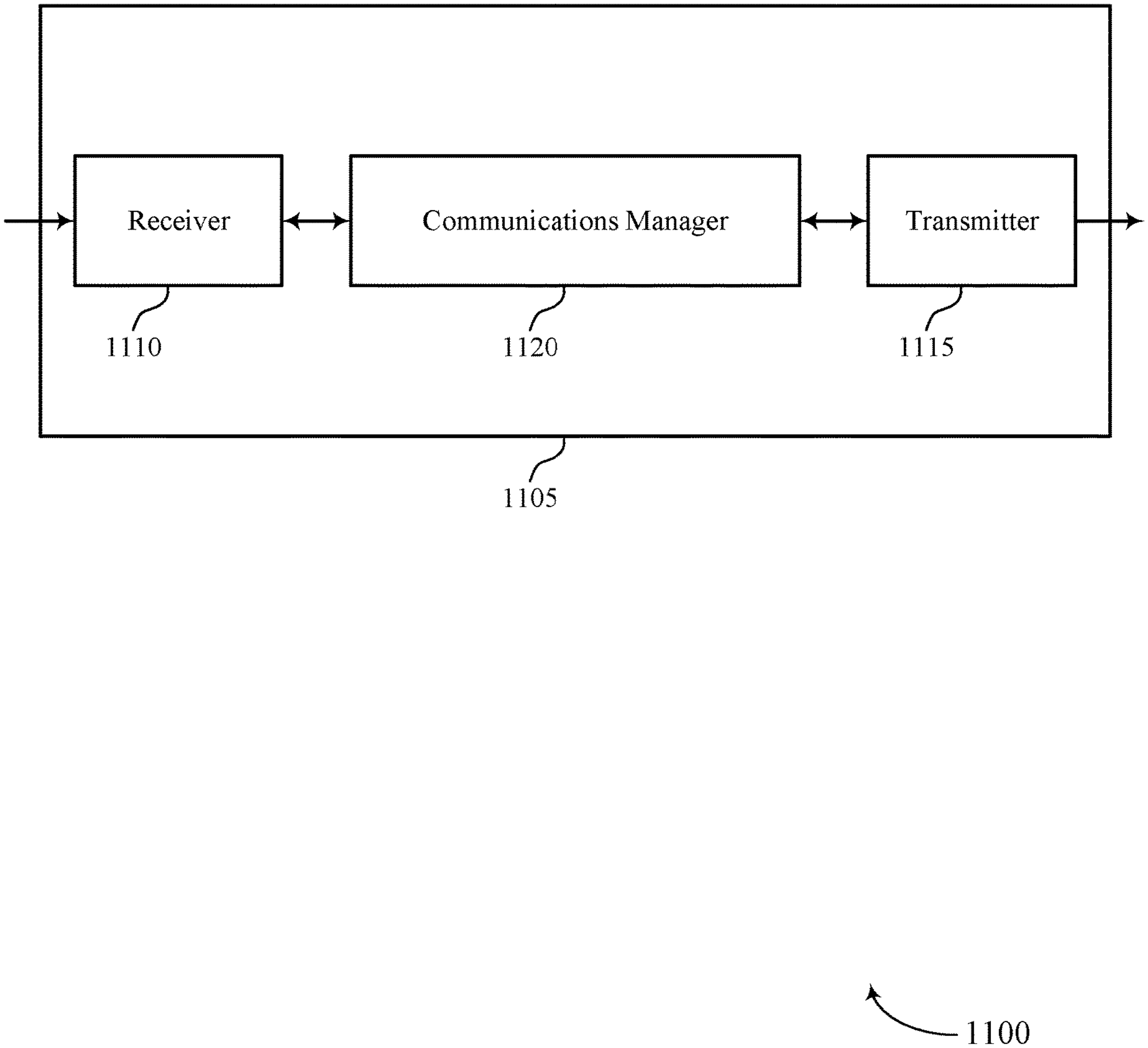
FIGS. 11 and 12 show block diagrams of devices that support nested search space enhancements in accordance with one or more aspects of the present disclosure.

FIG. 11 shows a block diagram 1100 of a device 1105 that supports nested search space enhancements in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations or components thereof may be examples of means for performing various aspects of nested search space enhancements as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for outputting, to a UE, an indication of a nesting state for a SSS of a control channel, where the nesting state corresponds to one or more wireless communication parameters of the UE and indicates that the UE is to search one or more CCEs of the SSS for a control message according to the nesting state. The communications manager 1120 is capable of, configured to, or operable to support a means for outputting, to the UE, the control message via the control channel in accordance with the nesting state.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for nesting operation enhancements that associate a nesting state of a UE with various wireless communication parameters of the UE.

Figure 12:
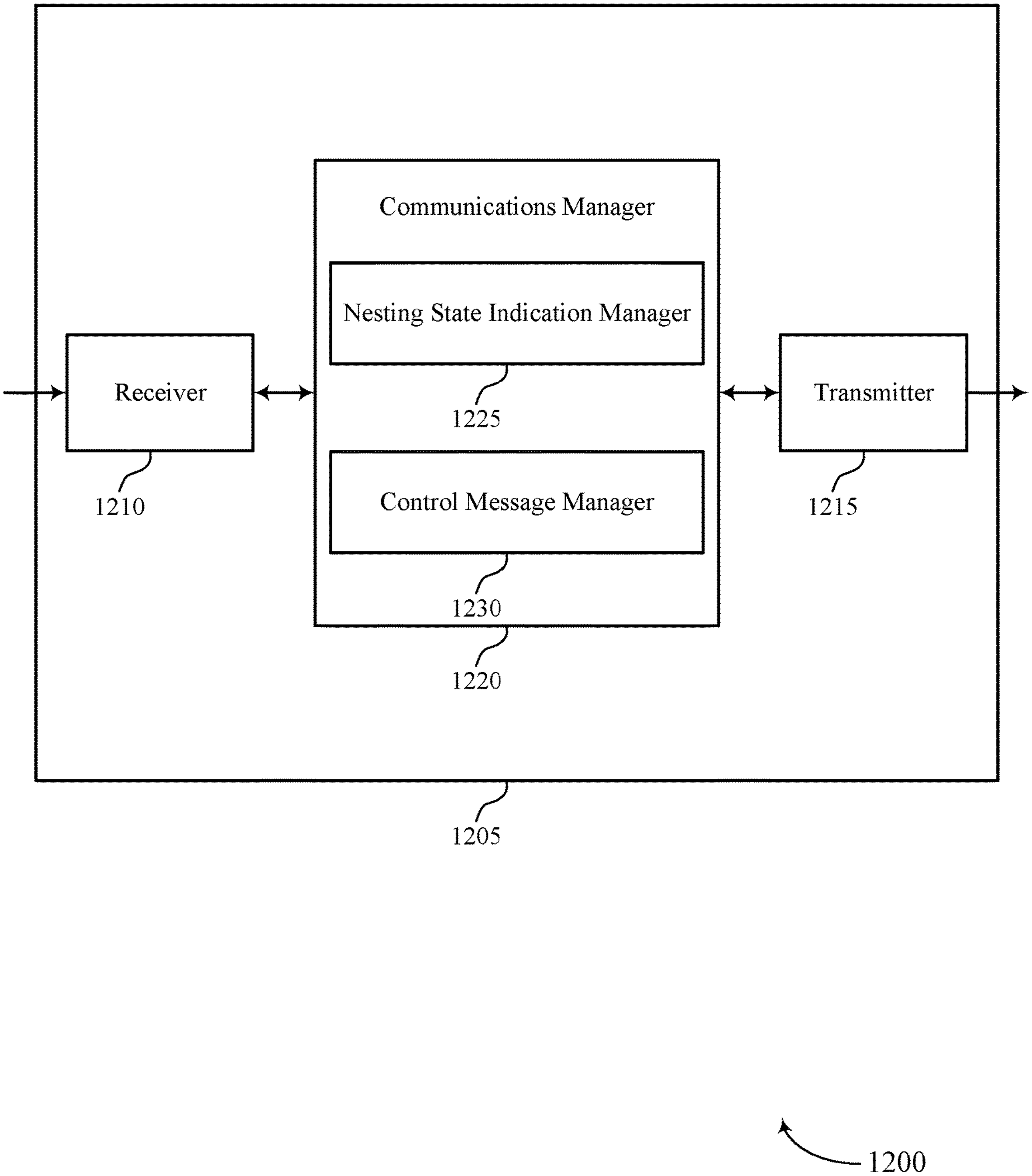

FIG. 12 shows a block diagram 1200 of a device 1205 that supports nested search space enhancements in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of nested search space enhancements as described herein. For example, the communications manager 1220 may include a nesting state indication manager 1225 a control message manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The nesting state indication manager 1225 is capable of, configured to, or operable to support a means for outputting, to a UE, an indication of a nesting state for a SSS of a control channel, where the nesting state corresponds to one or more wireless communication parameters of the UE and indicates that the UE is to search one or more CCEs of the SSS for a control message according to the nesting state. The control message manager 1230 is capable of, configured to, or operable to support a means for outputting, to the UE, the control message via the control channel in accordance with the nesting state.

Figure 13:
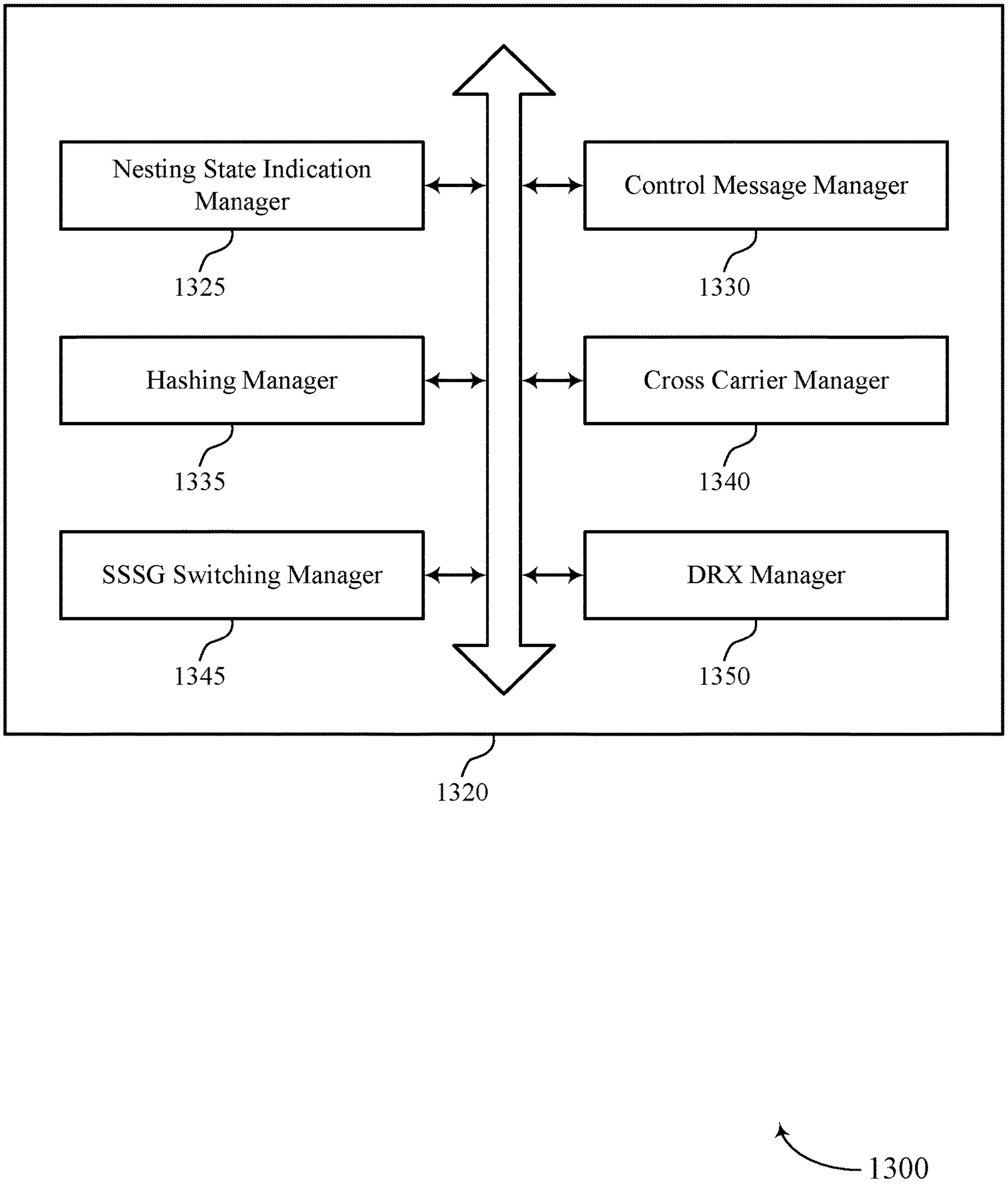
FIG. 13 shows a block diagram of a communications manager that supports nested search space enhancements in accordance with one or more aspects of the present disclosure.

FIG. 13 shows a block diagram 1300 of a communications manager 1320 that supports nested search space enhancements in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of nested search space enhancements as described herein. For example, the communications manager 1320 may include a nesting state indication manager 1325, a control message manager 1330, a hashing manager 1335, a cross carrier manager 1340, an SSSG switching manager 1345, a DRX manager 1350, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The nesting state indication manager 1325 is capable of, configured to, or operable to support a means for outputting, to a UE, an indication of a nesting state for a SSS of a control channel, where the nesting state corresponds to one or more wireless communication parameters of the UE and indicates that the UE is to search one or more CCEs of the SSS for a control message according to the nesting state. The control message manager 1330 is capable of, configured to, or operable to support a means for outputting, to the UE, the control message via the control channel in accordance with the nesting state.

In some examples, the one or more wireless communication parameters include a control channel skipping duration that identifies a quantity of search space monitoring occasions to skip during a set of one or more slots. In some examples, the nesting state includes a nesting disabled state based on the control channel skipping duration exceeding a threshold number of slots. In some examples, the nesting state includes a nesting enabled state based on the control channel skipping duration satisfying or being less than a threshold number of slots. In some examples, the nesting state includes a nesting enabled state based on the control channel skipping duration exceeding a threshold number of slots. In some examples, the nesting state includes a nesting disabled state based on the control channel skipping duration satisfying or being less than a threshold number of slots.

In some examples, the one or more wireless communication parameters include a SSSG switching configuration that identifies a set of SSSs for the UE to switch between. In some examples, to support outputting the indication, the SSSG switching manager 1345 is capable of, configured to, or operable to support a means for outputting information to the UE that identifies a set of SSSG switching configurations, where the information includes one or more bits that identify which of one or more SSSG switching configurations in the set of SSSG switching configurations is associated with a nesting enabled state.

In some examples, to support outputting the indication, the SSSG switching manager 1345 is capable of, configured to, or operable to support a means for outputting information to the UE that identifies a set of SSSG switching configurations, where the set of SSSG switching configurations include a first subset of one or more SSSG switching configurations that are associated with a nesting enabled state and a second subset of one or more SSSG switching configurations that are associated with a nesting disabled state. In some examples, the one or more wireless communication parameters include a DRX state that defines DRX ON periods where the UE is in an active state and DRX OFF periods where the UE is in an inactive state.

In some examples, to support outputting the indication, the DRX manager 1350 is capable of, configured to, or operable to support a means for operating in a first nesting state during the DRX ON periods and in a second nesting state during the DRX OFF periods, where the first nesting state is different from the second nesting state, and where the first nesting state is a nesting enabled state or a nesting disabled state.

In some examples, to support outputting the indication, the DRX manager 1350 is capable of, configured to, or operable to support a means for operating in a first nesting state based on a DRX inactivity timer duration satisfying a threshold and in a second nesting state based on the DRX inactivity timer duration failing to satisfy the threshold, where the first nesting state is different from the second nesting state, and where the first nesting state is a nesting enabled state or a nesting disabled state.

In some examples, the DRX manager 1350 is capable of, configured to, or operable to support a means for operating in a first nesting state based on a DRX periodicity satisfying a threshold and in a second nesting state based on the DRX periodicity failing to satisfy the threshold, where the first nesting state is different from the second nesting state, and where the first nesting state is a nesting enabled state or a nesting disabled state.

In some examples, the DRX manager 1350 is capable of, configured to, or operable to support a means for operating in a first nesting state based on a first type of DRX state and in a second nesting state based on a second type of DRX state, where the first nesting state is different from the second nesting state, and where the first nesting state is a nesting enabled state or a nesting disabled state.

In some examples, to support outputting the indication, the DRX manager 1350 is capable of, configured to, or operable to support a means for outputting a wakeup signal prior to each DRX ON period, where the wakeup signal indicates the nesting state for the DRX ON period.

In some examples, the hashing manager 1335 is capable of, configured to, or operable to support a means for performing a first hashing operation for the SSS in a first set of CCEs associated with a first AL. In some examples, the hashing manager 1335 is capable of, configured to, or operable to support a means for performing a second hashing operation for the SSS in a second set of CCEs associated with a second AL that is a lower AL than the first AL, where a quantity of CCEs in the second set of CCEs is based on CCEs in first set of CCEs, and where a quantity of hashing operations in the second hashing operation in the second set of CCEs is a divisible function based on CCEs in the first set of CCEs.

In some examples, the hashing manager 1335 is capable of, configured to, or operable to support a means for performing a first hashing operation for the SSS in a first set of CCEs associated with a first AL. In some examples, the hashing manager 1335 is capable of, configured to, or operable to support a means for performing a second hashing operation for the SSS in a second set of CCEs associated with a second AL that is a lower AL than the first AL, where a quantity of CCEs in the second set of CCEs is any quantity of CCEs within the first set of CCEs, and where a quantity of hashing operations in the second hashing operation in the second set of CCEs corresponds to any CCEs in the first set of CCEs.

In some examples, the SSS includes a first quantity of CCEs that are associated with a nesting enabled state and a second quantity of CCEs that are associated with the nesting enabled state or a nesting disabled state. In some examples, the first quantity of CCEs are non-overlapping CCEs with the second quantity of CCEs. In some examples, the SSS is on a first carrier and includes a first set of AL 16 CCEs associated with the first carrier and a second set of AL 16 CCEs associated with a second carrier that is cross-carrier scheduled by the first carrier. In some examples, the first set of AL 16 CCEs, the second set of AL 16 CCEs, or both, include one or more subsets of CCEs having a lower AL that are nested according to the nesting state. In some examples, at least one subset in the one or more subsets of CCEs in the first set of AL 16 CCEs, in the second set of AL 16 CCEs, or both, schedule communications on the first carrier or on the second carrier.

In some examples, to support outputting the indication, the nesting state indication manager 1325 is capable of, configured to, or operable to support a means for outputting the indication of the nesting state separately from the one or more wireless communication parameters. In some examples, the nesting state indication manager 1325 is capable of, configured to, or operable to support a means for outputting a second indication that activates or deactivates the nesting state. In some examples, the indication is output in an RRC message, a MAC-CE, a DCI, or any combination thereof.

In some examples, the one or more wireless communication parameters include a control resource set configuration, a SSS configuration, a SSS group configuration, a bandwidth part configuration, a search space type configuration, a search space overlap configuration, or any combination thereof.

In some examples, the control message manager 1330 is capable of, configured to, or operable to support a means for outputting a first portion of a downlink control information according to a nesting disabled state. In some examples, the control message manager 1330 is capable of, configured to, or operable to support a means for outputting a second portion of the downlink control information according to a nesting enabled state.

In some examples, the nesting state indication manager 1325 is capable of, configured to, or operable to support a means for obtaining, from the UE, a message requesting activation or deactivation of the nesting state. In some examples, the nesting state indication manager 1325 is capable of, configured to, or operable to support a means for obtaining, from the UE, a message requesting switching between a first nesting state and a second nesting state. In some examples, the nesting state indication manager 1325 is capable of, configured to, or operable to support a means for obtaining, from the UE, a message indicating support for nesting operations with the SSS.

In some examples, the nesting state indication manager 1325 is capable of, configured to, or operable to support a means for outputting, to the UE, a message requesting a preferred nesting state of the UE. In some examples, the nesting state indication manager 1325 is capable of, configured to, or operable to support a means for obtaining, from the UE, the preferred nesting state according to the message.

Figure 14:
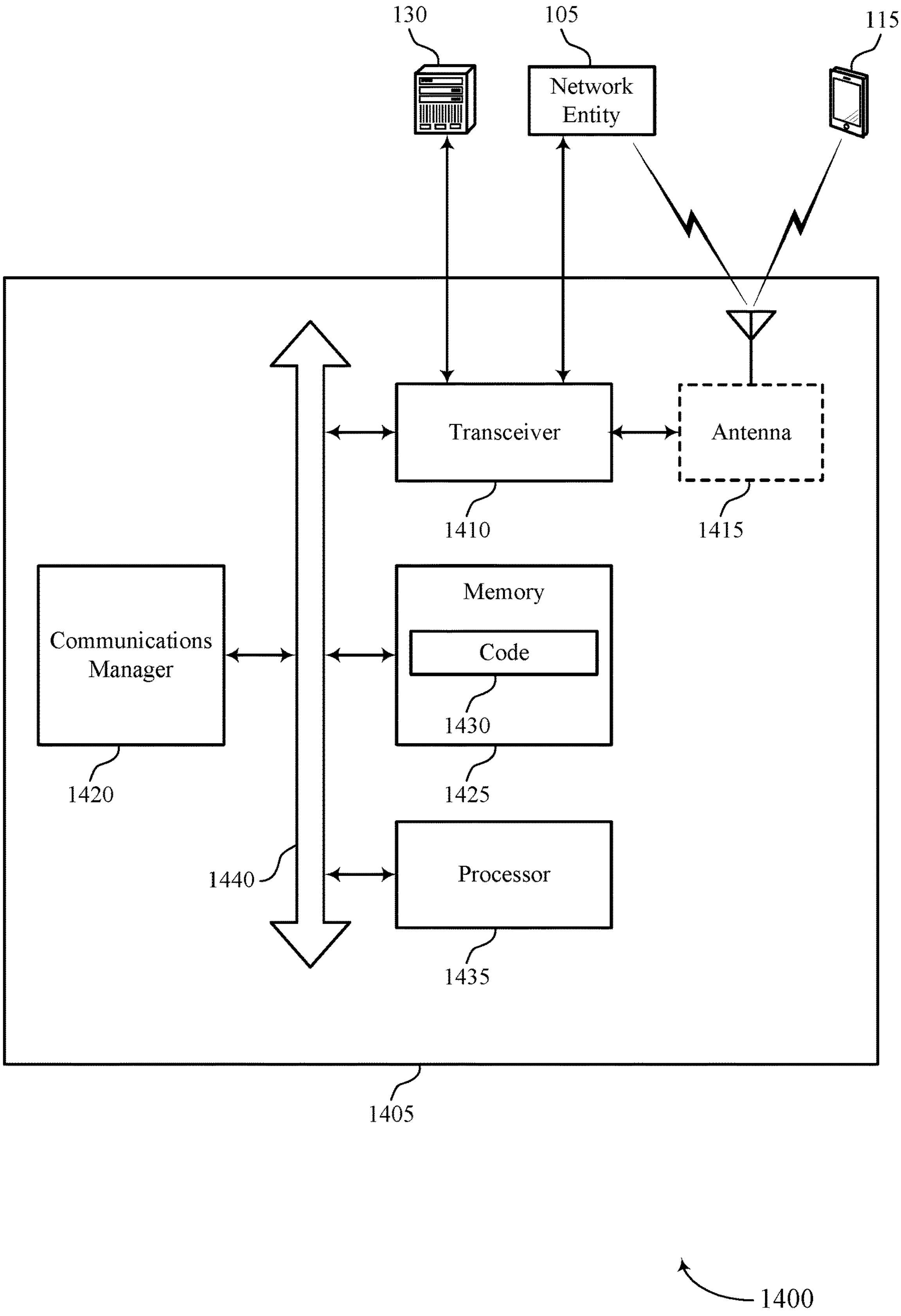
FIG. 14 shows a diagram of a system including a device that supports nested search space enhancements in accordance with one or more aspects of the present disclosure.

FIG. 14 shows a diagram of a system 1400 including a device 1405 that supports nested search space enhancements in accordance with one or more aspects of the present disclosure. The device 1405 may be an example of or include components of a device 1105, a device 1205, or a network entity 105 as described herein. The device 1405 may communicate with other network devices or network equipment such as one or more of the network entities 105, UEs 115, or any combination thereof. The communications may include communications over one or more wired interfaces, over one or more wireless interfaces, or any combination thereof. The device 1405 may include components that support outputting and obtaining communications, such as a communications manager 1420, a transceiver 1410, one or more antennas 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., communication link(s) 125, backhaul communication link(s) 120, a midhaul communication link 162, a fronthaul communication link 168).

The at least one memory 1425 may include RAM, ROM, or any combination thereof. The at least one memory 1425 may store computer-readable, computer-executable, or processor-executable code, such as the code 1430. The code 1430 may include instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may include, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting nested search space enhancements). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with one or more other network entities 105, and may include a controller or scheduler for controlling communications with UEs 115 (e.g., in cooperation with the one or more other network devices). In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for outputting, to a UE, an indication of a nesting state for a SSS of a control channel, where the nesting state corresponds to one or more wireless communication parameters of the UE and indicates that the UE is to search one or more CCEs of the SSS for a control message according to the nesting state. The communications manager 1420 is capable of, configured to, or operable to support a means for outputting, to the UE, the control message via the control channel in accordance with the nesting state.

By including or configuring the communications manager 1420 in accordance with examples as described herein, the device 1405 may support techniques for nesting operation enhancements that associate a nesting state of a UE with various wireless communication parameters of the UE.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described herein with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of nested search space enhancements as described herein, or the at least one processor 1435 and the at least one memory 1425 may be otherwise configured to, individually or collectively, perform or support such operations.

Figure 15:
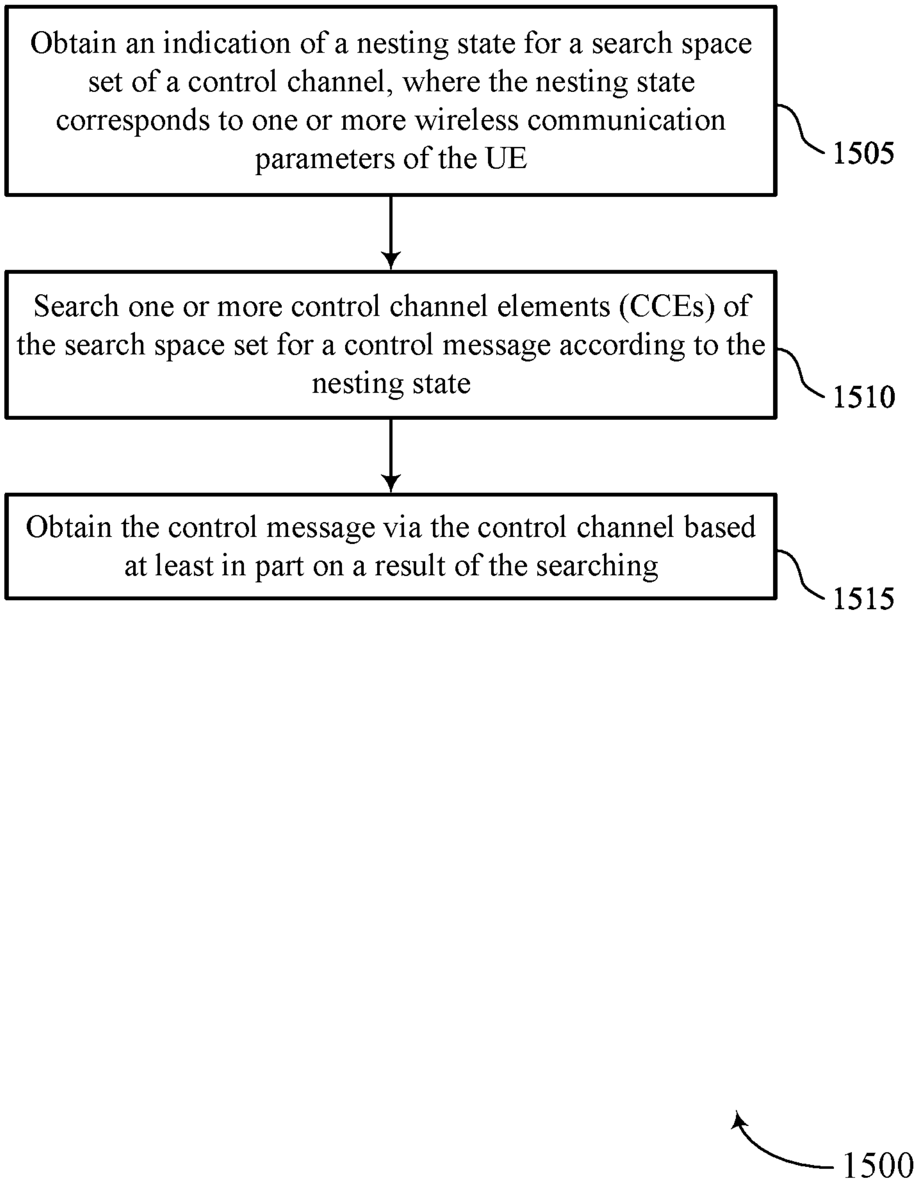
FIGS. 15 through 18 show flowcharts illustrating methods that support nested search space enhancements in accordance with one or more aspects of the present disclosure.

FIG. 15 shows a flowchart illustrating a method 1500 that supports nested search space enhancements in accordance with one or more aspects of the present disclosure. The operations of the method 1500 may be implemented by a UE or its components as described herein. For example, the operations of the method 1500 may be performed by a UE 115 as described herein with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include obtaining an indication of a nesting state for a SSS of a control channel, where the nesting state corresponds to one or more wireless communication parameters of the UE. The operations of 1505 may be performed in accordance with examples as disclosed herein. In some examples, aspects of the operations of 1505 may be performed by a nesting state indication manager 925 as described herein with reference to FIG. 9.

At 1510, the method may include searching one or more CCEs of the SSS for a control message according to the nesting state. The operations of 1510 may be performed in accordance with examples as disclosed herein. In some examples, aspects of the operations of 1510 may be performed by an SSS search manager 930 as described herein with reference to FIG. 9.

At 1515, the method may include obtaining the control message via the control channel based at least in part on a result of the searching. The operations of 1515 may be performed in accordance with examples as disclosed herein. In some examples, aspects of the operations of 1515 may be performed by a control message manager 935 as described herein with reference to FIG. 9.

Figure 16:
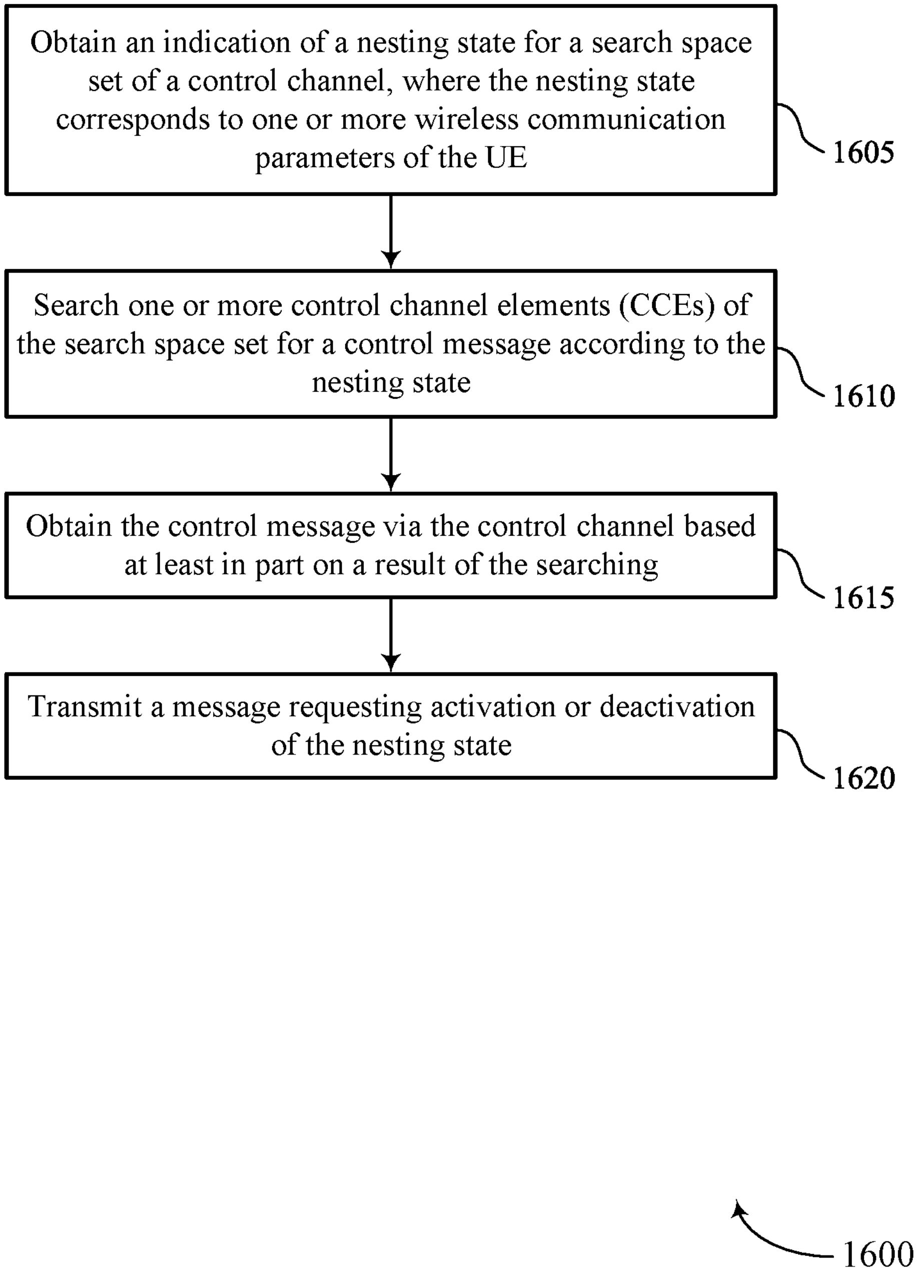

FIG. 16 shows a flowchart illustrating a method 1600 that supports nested search space enhancements in accordance with one or more aspects of the present disclosure. The operations of the method 1600 may be implemented by a UE or its components as described herein. For example, the operations of the method 1600 may be performed by a UE 115 as described herein with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include obtaining an indication of a nesting state for a SSS of a control channel, where the nesting state corresponds to one or more wireless communication parameters of the UE. The operations of 1605 may be performed in accordance with examples as disclosed herein. In some examples, aspects of the operations of 1605 may be performed by a nesting state indication manager 925 as described herein with reference to FIG. 9.

At 1610, the method may include searching one or more CCEs of the SSS for a control message according to the nesting state. The operations of 1610 may be performed in accordance with examples as disclosed herein. In some examples, aspects of the operations of 1610 may be performed by an SSS search manager 930 as described herein with reference to FIG. 9.

At 1615, the method may include obtaining the control message via the control channel based at least in part on a result of the searching. The operations of 1615 may be performed in accordance with examples as disclosed herein. In some examples, aspects of the operations of 1615 may be performed by a control message manager 935 as described herein with reference to FIG. 9.

At 1620, the method may include transmitting a message requesting activation or deactivation of the nesting state. The operations of 1620 may be performed in accordance with examples as disclosed herein. In some examples, aspects of the operations of 1620 may be performed by a nesting state indication manager 925 as described herein with reference to FIG. 9.

Figure 17:
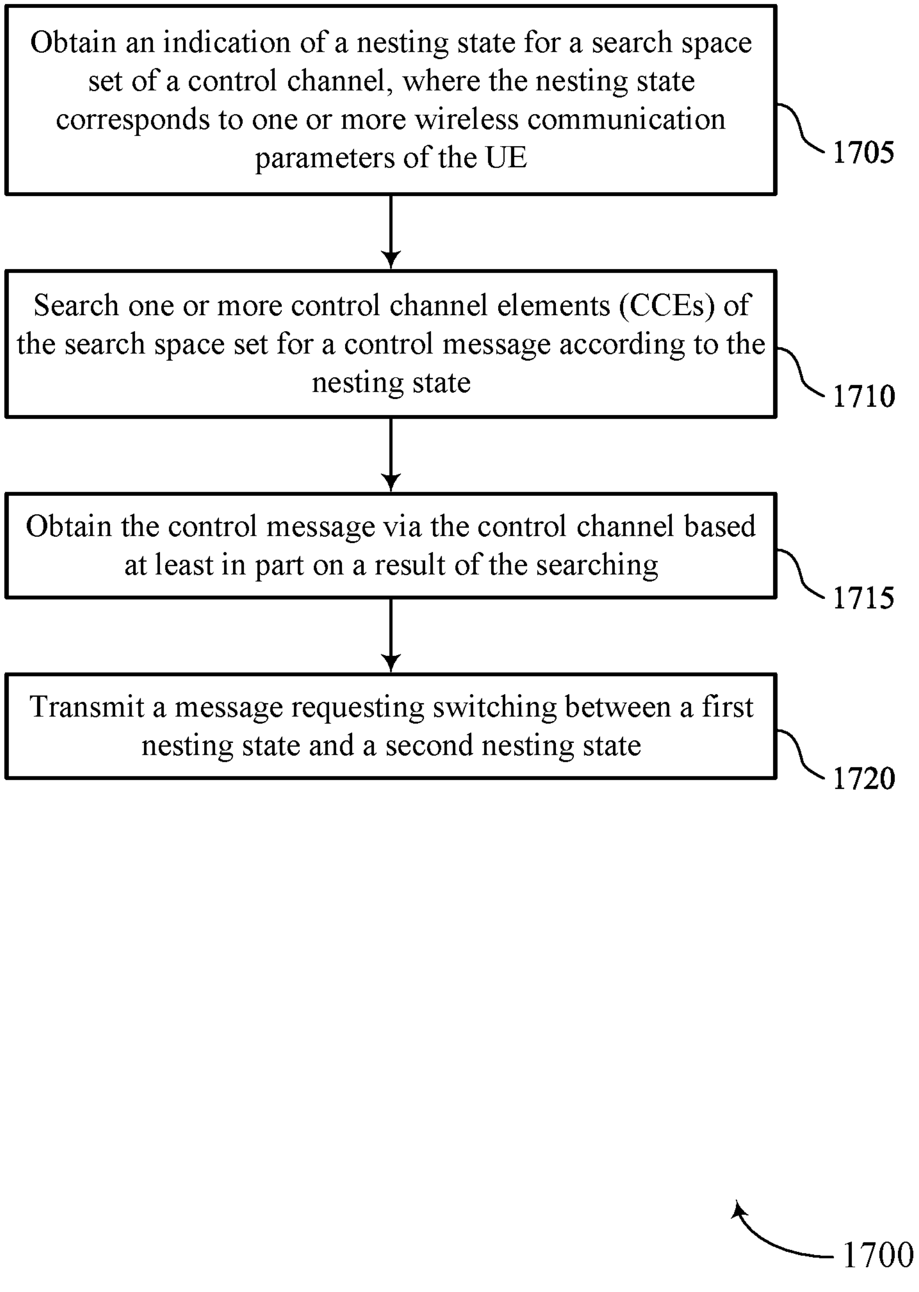

FIG. 17 shows a flowchart illustrating a method 1700 that supports nested search space enhancements in accordance with one or more aspects of the present disclosure. The operations of the method 1700 may be implemented by a UE or its components as described herein. For example, the operations of the method 1700 may be performed by a UE 115 as described herein with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include obtaining an indication of a nesting state for a SSS of a control channel, where the nesting state corresponds to one or more wireless communication parameters of the UE. The operations of 1705 may be performed in accordance with examples as disclosed herein. In some examples, aspects of the operations of 1705 may be performed by a nesting state indication manager 925 as described herein with reference to FIG. 9.

At 1710, the method may include searching one or more CCEs of the SSS for a control message according to the nesting state. The operations of 1710 may be performed in accordance with examples as disclosed herein. In some examples, aspects of the operations of 1710 may be performed by an SSS search manager 930 as described herein with reference to FIG. 9.

At 1715, the method may include obtaining the control message via the control channel based at least in part on a result of the searching. The operations of 1715 may be performed in accordance with examples as disclosed herein. In some examples, aspects of the operations of 1715 may be performed by a control message manager 935 as described herein with reference to FIG. 9.

At 1720, the method may include transmitting a message requesting switching between a first nesting state and a second nesting state. The operations of 1720 may be performed in accordance with examples as disclosed herein. In some examples, aspects of the operations of 1720 may be performed by a nesting state indication manager 925 as described herein with reference to FIG. 9.

Figure 18:
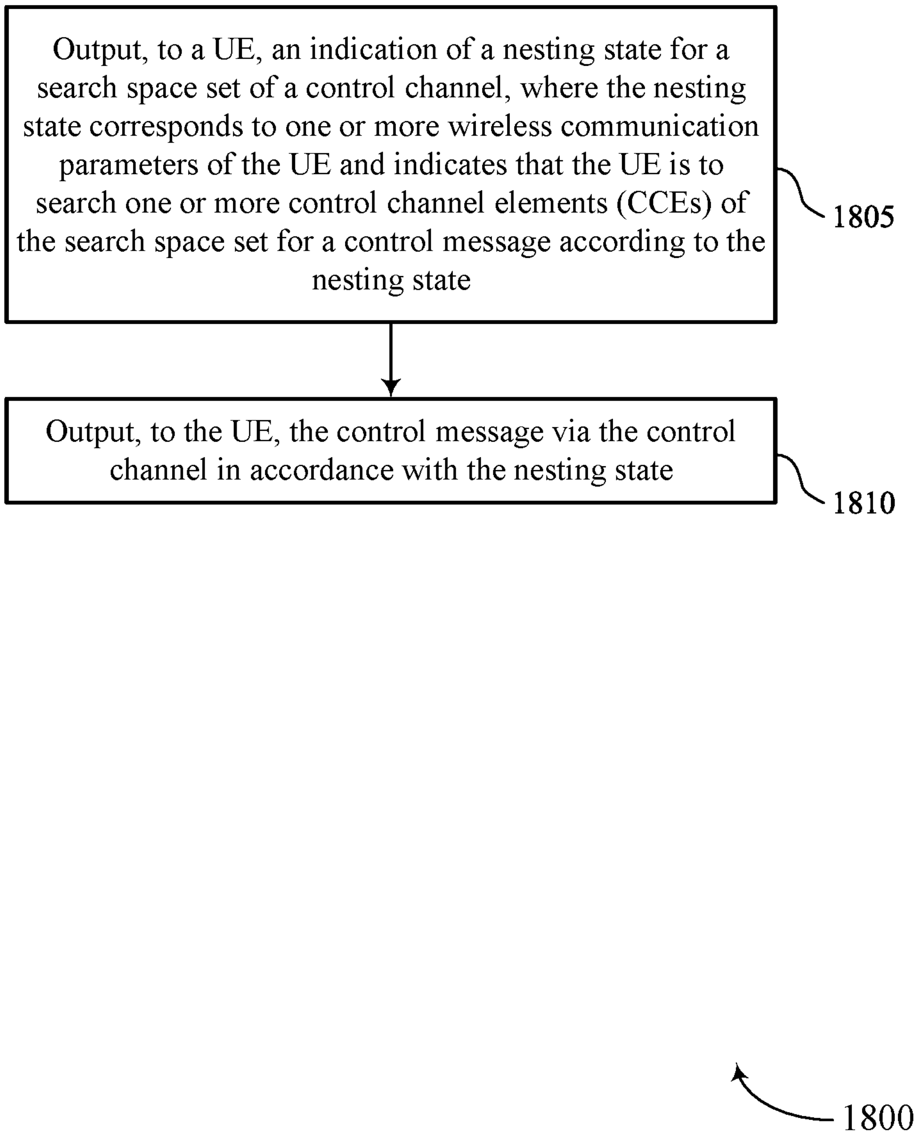

FIG. 18 shows a flowchart illustrating a method 1800 that supports nested search space enhancements in accordance with one or more aspects of the present disclosure. The operations of the method 1800 may be implemented by a network entity or its components as described herein. For example, the operations of the method 1800 may be performed by a network entity as described herein with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include outputting, to a UE, an indication of a nesting state for a SSS of a control channel, where the nesting state corresponds to one or more wireless communication parameters of the UE and indicates that the UE is to search one or more CCEs of the SSS for a control message according to the nesting state. The operations of 1805 may be performed in accordance with examples as disclosed herein. In some examples, aspects of the operations of 1805 may be performed by a nesting state indication manager 1325 as described herein with reference to FIG. 13.

At 1810, the method may include outputting, to the UE, the control message via the control channel in accordance with the nesting state. The operations of 1810 may be performed in accordance with examples as disclosed herein. In some examples, aspects of the operations of 1810 may be performed by a control message manager 1330 as described herein with reference to FIG. 13.

The following provides an overview of aspects of the present disclosure:

Aspect 1: A method for wireless communications at a UE, comprising: obtaining an indication of a nesting state for a SSS of a control channel, wherein the nesting state corresponds to one or more wireless communication parameters of the UE; searching one or more CCEs of the SSS for a control message according to the nesting state; and obtaining the control message via the control channel based at least in part on a result of the searching.

Aspect 2: The method of aspect 1, wherein the one or more wireless communication parameters comprise a control channel skipping duration that identifies a quantity of search space monitoring occasions to skip during a set of one or more slots.

Aspect 3: The method of aspect 2, wherein obtaining the indication comprises: determining that the control channel skipping duration exceeds a threshold number of slots, wherein the nesting state comprises a nesting disabled state based at least in part on the control channel skipping duration exceeding the threshold number of slots.

Aspect 4: The method of any of aspects 2 through 3, wherein obtaining the indication comprises: determining that the control channel skipping duration has satisfied or is less than a threshold number of slots, wherein the nesting state comprises a nesting enabled state based at least in part on the control channel skipping duration satisfying or being less than the threshold number of slots.

Aspect 5: The method of any of aspects 2 through 4, wherein obtaining the indication comprises: determining that the control channel skipping duration exceeds a threshold number of slots, wherein the nesting state comprises a nesting enabled state based at least in part on the control channel skipping duration exceeding the threshold number of slots.

Aspect 6: The method of any of aspects 2 through 5, wherein obtaining the indication comprises: determining that the control channel skipping duration has satisfied or is less than a threshold number of slots, wherein the nesting state comprises a nesting disabled state based at least in part on the control channel skipping duration satisfying or being less than the threshold number of slots.

Aspect 7: The method of any of aspects 1 through 6, wherein the one or more wireless communication parameters comprise a SSSG switching configuration that identifies a set of SSSs for the UE to switch between.

Aspect 8: The method of aspect 7, wherein obtaining the indication comprises: obtaining information identifying a set of SSSG switching configurations, wherein the information comprises one or more bits that identify which of one or more SSSG switching configurations in the set of SSSG switching configurations is associated with a nesting enabled state.

Aspect 9: The method of any of aspects 7 through 8, wherein obtaining the indication comprises: obtaining information identifying a set of SSSG switching configurations, wherein the set of SSSG switching configurations comprise a first subset of one or more SSSG switching configurations that are associated with a nesting enabled state and a second subset of one or more SSSG switching configurations that are associated with a nesting disabled state.

Aspect 10: The method of any of aspects 1 through 9, wherein the one or more wireless communication parameters comprise a DRX state that defines DRX ON periods where the UE is in an active state and DRX OFF periods where the UE is in an inactive state.

Aspect 11: The method of aspect 10, wherein obtaining the indication comprises: operating in a nesting disabled state during the DRX ON periods and in a nesting enabled state during the DRX OFF periods.

Aspect 12: The method of any of aspects 10 through 11, wherein obtaining the indication comprises: operating in a first nesting state based at least in part on a DRX inactivity timer duration satisfying a threshold and in a second nesting state based at least in part on the DRX inactivity timer duration failing to satisfy the threshold, wherein the first nesting state is different from the second nesting state, and wherein the first nesting state is a nesting enabled state or a nesting disabled state.

Aspect 13: The method of any of aspects 10 through 12, wherein obtaining the indication comprises: operating in a first nesting state based at least in part on a DRX periodicity satisfying a threshold and in a second nesting state based at least in part on the DRX periodicity failing to satisfy the threshold, wherein the first nesting state is different from the second nesting state, and wherein the first nesting state is a nesting enabled state or a nesting disabled state.

Aspect 14: The method of any of aspects 10 through 13, wherein obtaining the indication comprises: operating in a first nesting state based at least in part on a first type of DRX state and in a second nesting state based at least in part on a second type of DRX state, wherein the first nesting state is different from the second nesting state, and wherein the first nesting state is a nesting enabled state or a nesting disabled state.

Aspect 15: The method of any of aspects 10 through 14, wherein obtaining the indication comprises: obtaining a wakeup signal prior to each DRX ON period, wherein the wakeup signal indicates the nesting state for the DRX ON period.

Aspect 16: The method of any of aspects 1 through 15, wherein the nesting state comprises a nesting enabled state, further comprising: performing a first hashing operation for the SSS in a first set of CCEs associated with a first AL; and performing a second hashing operation for the SSS in a second set of CCEs associated with a second AL that is a lower AL than the first AL, wherein a quantity of CCEs in the second set of CCEs is based at least in part on CCEs in first set of CCEs, and wherein a quantity of hashing operations in the second hashing operation in the second set of CCEs is a divisible function based on CCEs in the first set of CCEs.

Aspect 17: The method of any of aspects 1 through 16, wherein the nesting state comprises a nesting enabled state, further comprising: performing a first hashing operation for the SSS in a first set of CCEs associated with a first AL; and performing a second hashing operation for the SSS in a second set of CCEs associated with a second AL that is a lower AL than the first AL, wherein a quantity of CCEs in the second set of CCEs is any quantity of CCEs within the first set of CCEs, and wherein a quantity of hashing operations in the second hashing operation in the second set of CCEs corresponds to any CCEs in the first set of CCEs.

Aspect 18: The method of any of aspects 1 through 17, wherein the SSS comprises a first quantity of CCEs that are associated with a nesting enabled state and a second quantity of CCEs that are associated with the nesting enabled state or a nesting disabled state, and the first quantity of CCEs are non-overlapping CCEs with the second quantity of CCEs.

Aspect 19: The method of any of aspects 1 through 18, wherein the SSS is on a first carrier and comprises a first set of AL 16 CCEs associated with the first carrier and a second set of AL 16 CCEs associated with a second carrier that is cross-carrier scheduled by the first carrier, and the first set of AL 16 CCEs, the second set of AL 16 CCEs, or both, comprise one or more subsets of CCEs having a lower AL that are nested according to the nesting state.

Aspect 20: The method of aspect 19, wherein at least one subset in the one or more subsets of CCEs in the first set of AL 16 CCEs, in the second set of AL 16 CCEs, or both, schedule communications on the first carrier or on the second carrier.

Aspect 21: The method of any of aspects 1 through 20, wherein obtaining the indication comprises: receiving the indication of the nesting state separately from the one or more wireless communication parameters.

Aspect 22: The method of aspect 21, further comprising: receiving a second indication that activates or deactivates the nesting state.

Aspect 23: The method of any of aspects 21 through 22, wherein the indication is received in an RRC message, a MAC-CE, a DCI, or any combination thereof.

Aspect 24: The method of any of aspects 1 through 23, wherein the one or more wireless communication parameters comprise a control resource set configuration, a SSS configuration, a SSS group configuration, a BWP configuration, a search space type configuration, a search space overlap configuration, or any combination thereof.

Aspect 25: The method of any of aspects 1 through 24, further comprising: receiving a first portion of a downlink control information according to a nesting disabled state; and receiving a second portion of the downlink control information according to a nesting enabled state.

Aspect 26: The method of any of aspects 1 through 25, further comprising: transmitting a message requesting activation or deactivation of the nesting state.

Aspect 27: The method of any of aspects 1 through 26, further comprising: transmitting a message requesting switching between a first nesting state and a second nesting state.

Aspect 28: The method of any of aspects 1 through 27, further comprising: transmitting a message indicating support for nesting operations with the SSS.

Aspect 29: The method of any of aspects 1 through 28, further comprising: receiving a message requesting a preferred nesting state of the UE; and transmitting the preferred nesting state according to the message.

Aspect 30: A method for wireless communications at a network entity, comprising: outputting, to a UE, an indication of a nesting state for a SSS of a control channel, wherein the nesting state corresponds to one or more wireless communication parameters of the UE and indicates that the UE is to search one or more CCEs of the SSS for a control message according to the nesting state; and outputting, to the UE, the control message via the control channel in accordance with the nesting state.

Aspect 31: The method of aspect 30, wherein the one or more wireless communication parameters comprise a control channel skipping duration that identifies a quantity of search space monitoring occasions to skip during a set of one or more slots.

Aspect 32: The method of aspect 31, wherein the nesting state comprises a nesting disabled state based at least in part on the control channel skipping duration exceeding a threshold number of slots.

Aspect 33: The method of any of aspects 31 through 32, wherein the nesting state comprises a nesting enabled state based at least in part on the control channel skipping duration satisfying or being less than a threshold number of slots.

Aspect 34: The method of any of aspects 31 through 33, wherein the nesting state comprises a nesting enabled state based at least in part on the control channel skipping duration exceeding a threshold number of slots.

Aspect 35: The method of any of aspects 31 through 34, wherein the nesting state comprises a nesting disabled state based at least in part on the control channel skipping duration satisfying or being less than a threshold number of slots.

Aspect 36: The method of any of aspects 30 through 35, wherein the one or more wireless communication parameters comprise a SSSG switching configuration that identifies a set of SSSs for the UE to switch between.

Aspect 37: The method of aspect 36, wherein outputting the indication comprises: outputting information to the UE that identifies a set of SSSG switching configurations, wherein the information comprises one or more bits that identify which of one or more SSSG switching configurations in the set of SSSG switching configurations is associated with a nesting enabled state.

Aspect 38: The method of any of aspects 36 through 37, wherein outputting the indication comprises: outputting information to the UE that identifies a set of SSSG switching configurations, wherein the set of SSSG switching configurations comprise a first subset of one or more SSSG switching configurations that are associated with a nesting enabled state and a second subset of one or more SSSG switching configurations that are associated with a nesting disabled state.

Aspect 39: The method of any of aspects 30 through 38, wherein the one or more wireless communication parameters comprise a DRX state that defines DRX ON periods where the UE is in an active state and DRX OFF periods where the UE is in an inactive state.

Aspect 40: The method of aspect 39, wherein outputting the indication comprises: operating in a first nesting state during the DRX ON periods and in a second nesting state during the DRX OFF periods, wherein the first nesting state is different from the second nesting state, and wherein the first nesting state is a nesting enabled state or a nesting disabled state.

Aspect 41: The method of any of aspects 39 through 40, wherein outputting the indication comprises: operating in a first nesting state based at least in part on a DRX inactivity timer duration satisfying a threshold and in a second nesting state based at least in part on the DRX inactivity timer duration failing to satisfy the threshold, wherein the first nesting state is different from the second nesting state, and wherein the first nesting state is a nesting enabled state or a nesting disabled state.

Aspect 42: The method of any of aspects 39 through 41, wherein further comprising: operating in a first nesting state based at least in part on a DRX periodicity satisfying a threshold and in a second nesting state based at least in part on the DRX periodicity failing to satisfy the threshold, wherein the first nesting state is different from the second nesting state, and wherein the first nesting state is a nesting enabled state or a nesting disabled state.

Aspect 43: The method of any of aspects 39 through 42, wherein further comprising: operating in a first nesting state based at least in part on a first type of DRX state and in a second nesting state based at least in part on a second type of DRX state, wherein the first nesting state is different from the second nesting state, and wherein the first nesting state is a nesting enabled state or a nesting disabled state.

Aspect 44: The method of any of aspects 39 through 43, wherein outputting the indication comprises: outputting a wakeup signal prior to each DRX ON period, wherein the wakeup signal indicates the nesting state for the DRX ON period.

Aspect 45: The method of any of aspects 30 through 44, wherein the nesting state comprises a nesting enabled state, further comprising: performing a first hashing operation for the SSS in a first set of CCEs associated with a first AL; and performing a second hashing operation for the SSS in a second set of CCEs associated with a second AL that is a lower AL than the first AL, wherein a quantity of CCEs in the second set of CCEs is based at least in part on CCEs in first set of CCEs, and wherein a quantity of hashing operations in the second hashing operation in the second set of CCEs is a divisible function based on CCEs in the first set of CCEs.

Aspect 46: The method of any of aspects 30 through 45, wherein the nesting state comprises a nesting enabled state, further comprising: performing a first hashing operation for the SSS in a first set of CCEs associated with a first AL; and performing a second hashing operation for the SSS in a second set of CCEs associated with a second AL that is a lower AL than the first AL, wherein a quantity of CCEs in the second set of CCEs is any quantity of CCEs within the first set of CCEs, and wherein a quantity of hashing operations in the second hashing operation in the second set of CCEs corresponds to any CCEs in the first set of CCEs.

Aspect 47: The method of any of aspects 30 through 46, wherein the SSS comprises a first quantity of CCEs that are associated with a nesting enabled state and a second quantity of CCEs that are associated with the nesting enabled state or a nesting disabled state, and the first quantity of CCEs are non-overlapping CCEs with the second quantity of CCEs.

Aspect 48: The method of any of aspects 30 through 47, wherein the SSS is on a first carrier and comprises a first set of AL 16 CCEs associated with the first carrier and a second set of AL 16 CCEs associated with a second carrier that is cross-carrier scheduled by the first carrier, and the first set of AL 16 CCEs, the second set of AL 16 CCEs, or both, comprise one or more subsets of CCEs having a lower AL that are nested according to the nesting state.

Aspect 49: The method of aspect 48, wherein at least one subset in the one or more subsets of CCEs in the first set of AL 16 CCEs, in the second set of AL 16 CCEs, or both, schedule communications on the first carrier or on the second carrier.

Aspect 50: The method of any of aspects 30 through 49, wherein outputting the indication comprises: outputting the indication of the nesting state separately from the one or more wireless communication parameters.

Aspect 51: The method of aspect 50, further comprising: outputting a second indication that activates or deactivates the nesting state.

Aspect 52: The method of any of aspects 50 through 51, wherein the indication is output in an RRC message, a medium access control-control element (MAC-CE), a DCI, or any combination thereof.

Aspect 53: The method of any of aspects 30 through 52, wherein the one or more wireless communication parameters comprise a control resource set configuration, a SSS configuration, a SSS group configuration, a bandwidth part configuration, a search space type configuration, a search space overlap configuration, or any combination thereof.

Aspect 54: The method of any of aspects 30 through 53, further comprising: outputting a first portion of a DCI according to a nesting disabled state; and outputting a second portion of the DCI according to a nesting enabled state.

Aspect 55: The method of any of aspects 30 through 54, further comprising: obtaining, from the UE, a message requesting activation or deactivation of the nesting state.

Aspect 56: The method of any of aspects 30 through 55, further comprising: obtaining, from the UE, a message requesting switching between a first nesting state and a second nesting state.

Aspect 57: The method of any of aspects 30 through 56, further comprising: obtaining, from the UE, a message indicating support for nesting operations with the SSS.

Aspect 58: The method of any of aspects 30 through 57, further comprising: outputting, to the UE, a message requesting a preferred nesting state of the UE; and obtaining, from the UE, the preferred nesting state according to the message.

Aspect 59: A UE for wireless communications, comprising at least one processor and at least one memory coupled with the at least one processor, with instructions stored in the at least one memory, the instructions being executable by the at least one processor, individually or in any combination, to cause the UE to perform a method of any of aspects 1 through 29.

Aspect 60: A UE for wireless communications, comprising at least one means for performing a method of any of aspects 1 through 29.

Aspect 61: A non-transitory computer-readable medium storing code for wireless communications, the code comprising instructions executable by one or more processors to perform a method of any of aspects 1 through 29.

Aspect 62: A network entity for wireless communications, comprising at least one processor and at least one memory coupled with the at least one processor, with instructions stored in the at least one memory, the instructions being executable by the at least one processor, individually or in any combination, to cause the network entity to perform a method of any of aspects 30 through 58.

Aspect 63: A network entity for wireless communications, comprising at least one means for performing a method of any of aspects 30 through 58.

Aspect 64: A non-transitory computer-readable medium storing code for wireless communications, the code comprising instructions executable by one or more processors to perform a method of any of aspects 30 through 58.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

at least one processor; and at least one memory coupled with the at least one processor, with instructions stored in the at least one memory, the instructions being executable by the at least one processor, individual or in any combination, to cause the UE to:

obtain an indication of a nesting state for a search space set of a control channel, wherein the nesting state corresponds to one or more wireless communication parameters of the UE;

search one or more control channel elements (CCEs) of the search space set for a control message according to the nesting state; and obtain the control message via the control channel based at least in part on a result of the searching.

2. The UE of claim 1, wherein the one or more wireless communication parameters comprise a control channel skipping duration that identifies a quantity of search space monitoring occasions to skip during a set of one or more slots.

3. The UE of claim 2, wherein, to obtain the indication, the instructions being executable by the at least one processor, individually or in any combination, to cause the UE to:

determine that the control channel skipping duration exceeds a threshold number of slots, wherein the nesting state comprises a nesting disabled state based at least in part on the control channel skipping duration exceeding the threshold number of slots.

4. The UE of claim 2, wherein, to obtain the indication, the instructions being executable by the at least one processor, individually or in any combination, to cause the UE to:
determine that the control channel skipping duration has satisfied or is less than a threshold number of slots, wherein the nesting state comprises a nesting enabled state based at least in part on the control channel skipping duration satisfying or being less than the threshold number of slots.

5. The UE of claim 2, wherein, to obtain the indication, the instructions being executable by the at least one processor, individually or in any combination, to cause the UE to:
determine that the control channel skipping duration exceeds a threshold number of slots, wherein the nesting state comprises a nesting enabled state based at least in part on the control channel skipping duration exceeding the threshold number of slots.

6. The UE of claim 2, wherein, to obtain the indication, the instructions being executable by the at least one processor, individually or in any combination, to cause the UE to:
determine that the control channel skipping duration has satisfied or is less than a threshold number of slots, wherein the nesting state comprises a nesting disabled state based at least in part on the control channel skipping duration satisfying or being less than the threshold number of slots.

7. The UE of claim 1, wherein the one or more wireless communication parameters comprise a search space set group (SSSG) switching configuration that identifies a set of search space sets for the UE to switch between.

8. The UE of claim 7, wherein, to obtain the indication, the instructions being executable by the at least one processor, individually or in any combination, to cause the UE to:
obtain information identifying a set of SSSG switching configurations, wherein the information comprises one or more bits that identify which of one or more SSSG switching configurations in the set of SSSG switching configurations is associated with a nesting enabled state.

9. The UE of claim 7, wherein, to obtain the indication, the instructions being executable by the at least one processor, individually or in any combination, to cause the UE to:
obtain information identifying a set of SSSG switching configurations, wherein the set of SSSG switching configurations comprise a first subset of one or more SSSG switching configurations that are associated with a nesting enabled state and a second subset of one or more SSSG switching configurations that are associated with a nesting disabled state.

10. The UE of claim 1, wherein the one or more wireless communication parameters comprise a discontinuous reception (DRX) state that defines DRX ON periods where the UE is in an active state and DRX OFF periods where the UE is in an inactive state.

11. The UE of claim 10, wherein, to obtain the indication, the instructions being executable by the at least one processor, individually or in any combination, to cause the UE to:
operate in a nesting disabled state during the DRX ON periods and in a nesting enabled state during the DRX OFF periods.

12. The UE of claim 10, wherein, to obtain the indication, the instructions being executable by the at least one processor, individually or in any combination, to cause the UE to:
operate in a first nesting state based at least in part on a DRX inactivity timer duration satisfying a threshold and in a second nesting state based at least in part on the DRX inactivity timer duration failing to satisfy the threshold, wherein the first nesting state is different from the second nesting state, and wherein the first nesting state is a nesting enabled state or a nesting disabled state.

13. The UE of claim 10, wherein, to obtain the indication, the instructions being executable by the at least one processor, individually or in any combination, to cause the UE to:
operate in a first nesting state based at least in part on a DRX periodicity satisfying a threshold and in a second nesting state based at least in part on the DRX periodicity failing to satisfy the threshold, wherein the first nesting state is different from the second nesting state, and wherein the first nesting state is a nesting enabled state or a nesting disabled state.

14. The UE of claim 10, wherein, to obtain the indication, the instructions being executable by the at least one processor, individually or in any combination, to cause the UE to:
operate in a first nesting state based at least in part on a first type of DRX state and in a second nesting state based at least in part on a second type of DRX state, wherein the first nesting state is different from the second nesting state, and wherein the first nesting state is a nesting enabled state or a nesting disabled state.

15. The UE of claim 10, wherein, to obtain the indication, the instructions being executable by the at least one processor, individually or in any combination, to cause the UE to:
obtain a wakeup signal prior to each DRX ON period, wherein the wakeup signal indicates the nesting state for the DRX ON period.

16. The UE of claim 1, wherein, to obtain the indication, the instructions being executable by the at least one processor, individually or in any combination, to cause the UE to:
perform a first hashing operation for the search space set in a first set of CCEs associated with a first aggregation level; and
perform a second hashing operation for the search space set in a second set of CCEs associated with a second aggregation level that is a lower aggregation level than the first aggregation level, wherein a quantity of CCEs in the second set of CCEs is based at least in part on CCEs in first set of CCEs, and wherein a quantity of hashing operations in the second hashing operation in the second set of CCEs is a divisible function based on CCEs in the first set of CCEs.

17. The UE of claim 1, wherein, to obtain the indication, the instructions being executable by the at least one processor, individually or in any combination, to cause the UE to:
perform a first hashing operation for the search space set in a first set of CCEs associated with a first aggregation level; and
perform a second hashing operation for the search space set in a second set of CCEs associated with a second aggregation level that is a lower aggregation level than the first aggregation level, wherein a quantity of CCEs in the second set of CCEs is any quantity of CCEs within the first set of CCEs, and wherein a quantity of hashing operations in the second hashing operation in the second set of CCEs corresponds to any CCEs in the first set of CCEs.

18. The UE of claim 1, wherein:
the search space set comprises a first quantity of CCEs that are associated with a nesting enabled state and a second quantity of CCEs that are associated with the nesting enabled state or a nesting disabled state, and
the first quantity of CCEs are non-overlapping CCEs with the second quantity of CCEs.

19. A network entity, comprising:

at least one processor; and at least one memory coupled with the at least one processor, with instructions stored in the at least one memory, the instructions being executable by the at least one processor, individually or in any combination, to cause the network entity to:

output, to a user equipment (UE), an indication of a nesting state for a search space set of a control channel, wherein the nesting state corresponds to one or more wireless communication parameters of the UE and indicates that the UE is to search one or more control channel elements (CCEs) of the search space set for a control message according to the nesting state; and output, to the UE, the control message via the control channel in accordance with the nesting state.

20. A method for wireless communications at a user equipment (UE), comprising:

obtaining an indication of a nesting state for a search space set of a control channel, wherein the nesting state corresponds to one or more wireless communication parameters of the UE;

searching one or more control channel elements (CCEs) of the search space set for a control message according to the nesting state; and obtaining the control message via the control channel based at least in part on a result of the searching.

* * * * *